(12) United States Patent
Miller et al.

(10) Patent No.: US 12,131,658 B2
(45) Date of Patent: Oct. 29, 2024

(54) AIRPORT TAXI ROUTE GENERATOR

(71) Applicant: The Boeing Company, Chicago, IL (US)

(72) Inventors: Jason A. Miller, Austin, TX (US); Kristian I. Thaulow, Odense (DK); Matthew G. Croydon, Cedar Park, TX (US); Donald Jones, Austin, TX (US); Grant Macklem, Colorado Springs, CO (US); Garrett Moore, Austin, TX (US)

(73) Assignee: The Boeing Company, Arlington, VA (US)

( * ) Notice: Subject to any disclaimer, the term of this patent is extended or adjusted under 35 U.S.C. 154(b) by 204 days.

(21) Appl. No.: 17/726,470

(22) Filed: Apr. 21, 2022

(65) Prior Publication Data

US 2022/0343780 A1     Oct. 27, 2022

Related U.S. Application Data

(60) Provisional application No. 63/180,037, filed on Apr. 26, 2021.

(51) Int. Cl.
*G08G 5/06* (2006.01)
*G01C 21/34* (2006.01)
(Continued)

(52) U.S. Cl.
CPC ......... *G08G 5/065* (2013.01); *G01C 21/3446* (2013.01); *G01C 21/367* (2013.01);
(Continued)

(58) Field of Classification Search
CPC .. G08G 5/0013; G08G 5/0021; G08G 5/0065; G08G 5/06; G07C 5/0816;
(Continued)

(56) References Cited

U.S. PATENT DOCUMENTS 8,731,811 B2 * 5/2014 Bilek .................. G08G 5/065
                                                        701/120
9,786,186 B2 * 10/2017 Ball ................... G08G 5/0021
(Continued)

FOREIGN PATENT DOCUMENTS

EP         2584550 B1 * 8/2014 .......... G08G 5/0021

OTHER PUBLICATIONS

C. Liu and Y. Wang, "Aircraft Taxi Path Optimization Based on Ant Colony Algorithm," 2011 Fourth International Symposium on Computational Intelligence and Design, Hangzhou, China, 2011, pp. 226-229, doi: 10.1109/ISCID.2011.158. (Year: 2011).*
(Continued)

*Primary Examiner* — Cuong H Nguyen
(74) *Attorney, Agent, or Firm* — Alleman Hall & Tuttle LLP

(57) ABSTRACT

A method including displaying, in a graphical user interface (GUI) of a computer, a map of a plurality of airport taxiways. The method also includes receiving a start point on the map. The method also includes receiving an endpoint on the map. The method also includes generating, automatically, a path for an aircraft to take to navigate the plurality of taxiways from the start point to the endpoint. The method also includes superimposing the path on the map in the GUI.

20 Claims, 13 Drawing Sheets

(51) Int. Cl.
  *G01C 21/36* (2006.01)
  *G08G 5/00* (2006.01)
  *G07C 5/08* (2006.01)

(52) U.S. Cl.
  CPC ......... *G08G 5/0021* (2013.01); *G08G 5/0039* (2013.01); *G08G 5/006* (2013.01); *G07C 5/0816* (2013.01)

(58) Field of Classification Search
  CPC ......... G06F 17/30392; G06F 17/30498; G06F 3/048; G09B 29/006; G01C 21/3446; G01C 21/34
  USPC .......................... 701/528, 538; 707/713, 716
  See application file for complete search history.

(56) References Cited

U.S. PATENT DOCUMENTS

| | | | | |
|---|---|---|---|---|
| 10,074,285 | B2* | 9/2018 | Depape | G01C 21/3626 |
| 11,688,291 | B2* | 6/2023 | Wang | G01C 21/3676 |
| | | | | 701/120 |
| 2012/0254153 | A1* | 10/2012 | Abraham | G06F 16/353 |
| | | | | 707/812 |
| 2016/0140849 | A1* | 5/2016 | Ball | G06F 3/04847 |
| | | | | 701/538 |
| 2016/0290817 | A1* | 10/2016 | Hoogland | G01C 23/005 |
| 2017/0004715 | A1* | 1/2017 | Depape | G01C 21/3626 |
| 2018/0005530 | A1* | 1/2018 | Jeong | G08G 5/065 |
| 2018/0322166 | A1* | 11/2018 | Geigel | G06F 16/2456 |

OTHER PUBLICATIONS

Koeners, G. J. M., E. P. Stout, and R. M. Rademaker. "Improving taxi traffic flow by real-time runway sequence optimization using dynamic taxi route planning." 2011 IEEE/AIAA 30th Digital Avionics Systems Conference. IEEE, (Year: 2011).*

Rathinam, Sivakumar, Justin Montoya, and Yoon Jung. "An optimization model for reducing aircraft taxi times at the Dallas Fort Worth International Airport." 26th International Congress of the Aeronautical Sciences (ICAS). (Year: 2008).*

Rathinam, S., Montoya, J. and Jung, Y., 2008, September. An optimization model for reducing aircraft taxi times at the Dallas Fort Worth International Airport. In 26th International Congress of the Aeronautical Sciences (ICAS) (pp. 14-19) . . . (Year: 2008).*

Office Action in corresponding European Application No. 22169990.3 issued Oct. 6, 2022 (11 pages).

Comen, T. H., et al., "Introduction to Algorithms", Second edition, Sep. 1, 2001, 5 pages.

* cited by examiner

BEFORE:

AFTER:

AIRPORT TAXI ROUTE GENERATOR

RELATED APPLICATIONS

This application claims priority to U.S. Provisional Patent Application No. 63/180,037, filed Apr. 26, 2021, the contents of which are hereby incorporated by reference in their entirety.

BACKGROUND

When an aircraft takes off or lands at an airport, the aircraft may taxi the runways, taxiways, and ramps to or from various locations at an airport, such as a parking area, a fueling station, a hangar, etc. As used herein, the term "taxi" refers to maneuvering an aircraft on the ground when the aircraft is not in flight. As used herein, a runway is a section of set-aside space at an airport that aircraft use for take-off and landing. As used herein, a taxiway is a road at an airport, used by aircraft, that connects runways, other taxiways, ramps, parking areas, and/or terminals. However, the term "taxiways," when used in the plural sense, or the term "taxiway system", also may include runways, a taxiway or more than one taxiway, ramps, terminals, parking areas, hangars, or a combination thereof. As used herein, a ramp is a section of set-aside space at an airport, usually shorter than a taxiway, that connects a parking area, terminal, or taxiway to another taxiway. As used herein, a terminal is a location at an airport from which passengers and/or crew embark or disembark from an aircraft. As used herein, a hangar or parking area is a place at an airport where an aircraft is parked or stored when not in use or, sometimes, when being serviced.

Major airports can have a highly complex system of runways, taxiways, ramps, terminals, hangars, and aircraft parking areas. The complexity of the system can be difficult for a pilot to navigate, particularly when many taxiways are closely spaced and intersecting.

SUMMARY

The one or more embodiments provide for a method. The method includes displaying, in a graphical user interface (GUI) of a computer, a map of a plurality of airport taxiways. The method also includes receiving a start point on the map. The method also includes receiving an endpoint on the map. The method also includes generating, automatically, a path for an aircraft to take to navigate the plurality of taxiways from the start point to the endpoint. The method also includes superimposing the path on the map in the GUI.

The one or more embodiments also provide for a system. The system includes a computer including a processor; a data repository in communication with the processor; and a display device in communication with the processor and configured to display a graphical user interface (GUI). The data repository stores computer readable program code which, when executed by the processor, performs a computer-implemented method. The computer-implemented method includes displaying, in the graphical user interface (GUI), a map of a plurality of airport taxiways. The computer-implemented method also includes receiving a start point on the map. The computer-implemented method also includes receiving an endpoint on the map. The computer-implemented method also includes generating, automatically, a path for an aircraft to take to navigate the plurality of taxiways from the start point to the endpoint. The computer-implemented method also includes superimposing the path on the map in the GUI.

The one or more embodiments also provide for a non-transitory computer readable storage medium storing computer readable program code which, when executed by a processor, performs a computer-implemented method. The computer-implemented method includes displaying, in a graphical user interface (GUI) of a computer, a map of a plurality of airport taxiways. The computer-implemented method also includes receiving a start point on the map. The computer-implemented method also includes receiving an endpoint on the map. The computer-implemented method also includes generating, automatically, a path for an aircraft to take to navigate the plurality of taxiways from the start point to the endpoint. The computer-implemented method also includes superimposing the path on the map in the GUI.

Other aspects of the one or more embodiments will be apparent from the following description and the appended claims.

DETAILED DESCRIPTION

Figure 1:
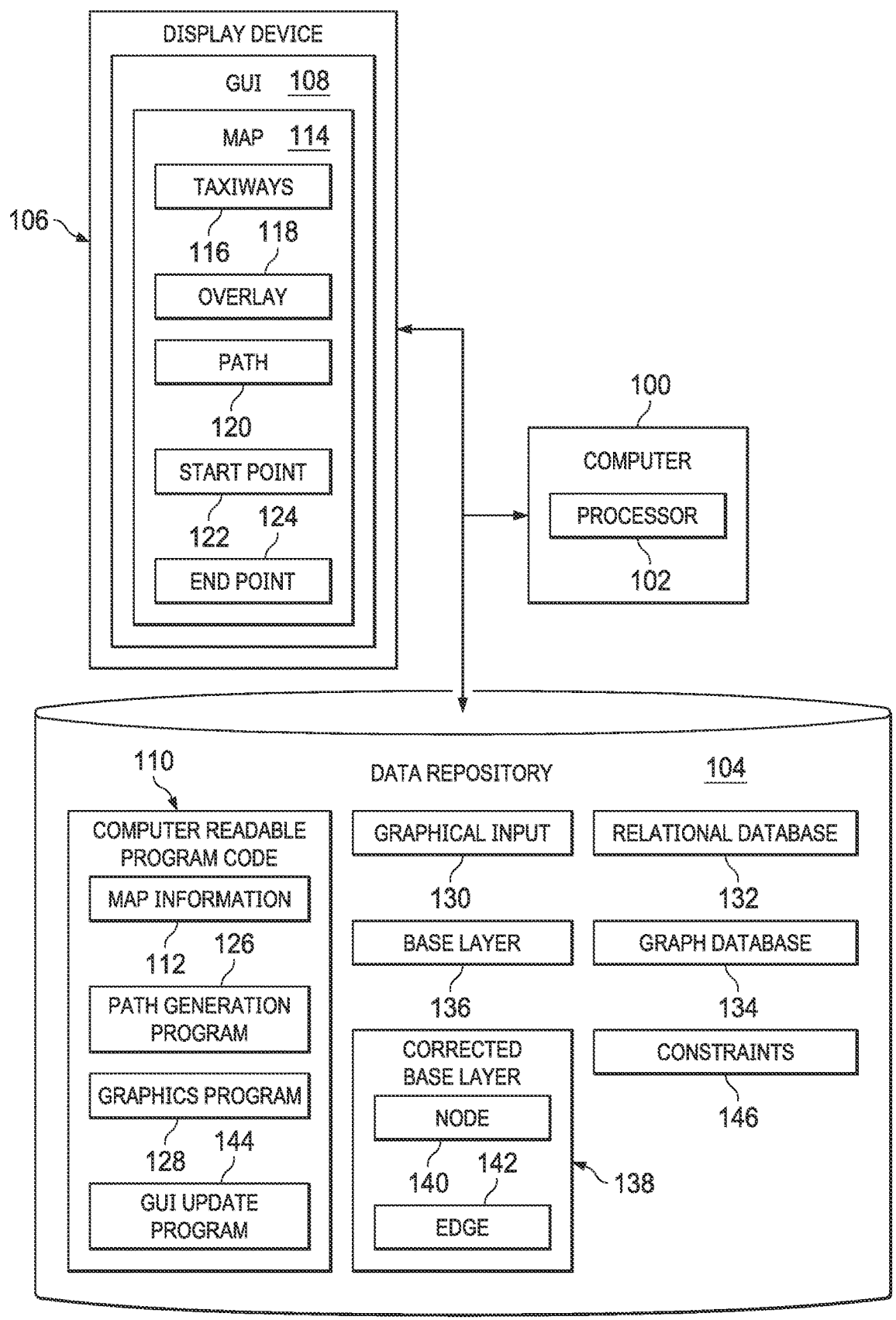
FIG. 1 shows a computing system for implementing an automated process for determining and displaying a taxi route on a graphical user interface (GUI), in accordance with one or more embodiments.

Specific embodiments of the one or more embodiments will now be described in detail with reference to the accompanying figures. Like elements in the various figures are denoted by like reference numerals for consistency.

In the following detailed description of the embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

In general, the one or more embodiments relate to processes and systems for determining the exact taxi route for an aircraft to follow at an airport and displaying the route on a graphical user interface (GUI). The one or more embodiments can automatically record, save, and display taxi instructions given by an air traffic control tower, and to recall, review, and/or update the displayed taxi path on the GUI as the taxi process proceeds. The instructions may be given by an air traffic controller, who may or may not be located in an air traffic control tower. Note that in many cases a tower controller only controls access to the runways. Another person may assume the role of a ground controller (who may or may not be a separate person from the tower controller), who will give taxi instructions. Thus, while the term "traffic control tower" is used herein, the one or more embodiments contemplate that a "air traffic controller" or "traffic control tower" automatically contemplate ground controllers or anyone responsible for managing ground or air traffic at an airport. Furthermore, an airport may be uncontrolled. At an uncontrolled airport (i.e. one that is not under air traffic control), a pilot can taxi from a starting point to an ending point according to a manner of his or her choosing (i.e. the pilot is not given instructions by an air traffic controller). Nevertheless, restrictions may be imposed by the pilot or possibly from other sources.

The one or more embodiments also enables quickly changing the route as desired via user-provided or automatically-provided input, including by graphical input from a user. Thus, for example, a pilot can alter the taxi route, or an air traffic controller can issue automatic commands which will alter the taxi route displayed on the GUI.

Attention is now turned to the figures. FIG. 1 shows a computing system for implementing an automated process for determining and displaying a taxi route on a graphical user interface (GUI), in accordance with one or more embodiments. The system shown in FIG. 1 may be implemented in one or more, possibly distributed, computers. The system shown in FIG. 1 may be implemented as a mobile computing device, such as a tablet, mobile phone, laptop computer, desktop computer, or on-board aircraft computer. The system shown in FIG. 1 may be implemented in part remotely, using processed data generated remotely and then transmitted to the tablet, mobile phone, laptop computer, desktop computer, or on-board aircraft computer for display on the GUI.

Thus, the computer (100) includes a processor (102), which represents one or more processors, possibly in a distributed computing environment. The system includes a data repository (104) which stores various information useable by the computer (100), as described below. The data repository (104) may be separate from the computer (100), or may be part of the computer (100). The system also includes a display device (106) which is a physical monitor or screen that is configured to display a GUI (108). Again, the term "GUI" means "graphical user interface." Whether or not part of the same computing system, the computer (100), the processor (102), the data repository (104), and the display device (106) are in communication with each other via a wired or wireless connection.

The data repository (104) stores computer readable program code (110) which, when executed by the processor (102), performs one or more computer-implemented methods. The one or more computer-implemented methods are described with respect to FIG. 2A through FIG. 2K.

The data repository (104) stores other information, such as map information (112). The map information (112) is data about an airport environment that a computer can use to implement the methods described herein to automatically generate and display a taxi route on the GUI (108). Thus, the processor (102) can be used to display in the GUI (108) a map (114) of one or more airport taxiways (116). As used herein, the term "airport taxiways (116)" may refer not only to taxiways, but also to runways, ramps, terminals, parking areas, and/or terminals.

The map (114) also displays an overlay (118). The overlay (118) is a superposition on the airport taxiways (116) on the map (114) displayed on the GUI (108). The overlay (118) is a highlighting of the airport taxiways (116) themselves, a line or lines drawn over the airport taxiways (116), or some other indication that a user can see regarding a path (120) to take along the airport taxiways (116) to move from a start point (122) to an endpoint (124) displayed on the map (114). The path is a visual representation of the set of airport taxiways that can be taken that satisfies current restrictions and/or path minimization between the start point (122) and the endpoint (124). The start point (122) is the point where path generation begins or changes, not necessarily where an aircraft lands or is parked. The endpoint (124) is the location where a pilot or an air traffic controller designates as where the aircraft is to taxi. The endpoint (124) may change over time or may be redefined as desired, in which case the computer (100) will automatically update the path (120) that satisfies available constraints and/or minimization.

The data repository (104) may also store a path generation program (126). The path generation program (126) is an example of the computer readable program code (110) that the processor (102) may execute in order to generate the path (120). Thus, the path generation program (126) is executable to generate, automatically, a path for an aircraft to take to navigate the plurality of taxiways from the start point to the endpoint. The path generation program (126) is program code which is executable to implement one or more of the steps in FIG. 2A through FIG. 2K that represents the algorithm for generating a path, as described herein. An example of the path generation program (126) is a graph database traversal program.

The data repository (104) may also store a graphics program (128). The graphics program (128) is an example of the computer readable program code (110) that the processor (102) may execute to superimpose the path (120) on the map (114) in the GUI (108). The path generation program (126) is program code which is executable to implement one or more of the steps in FIG. 2A through FIG. 2K that represents the algorithm for generating a path, as described herein.

The data repository (104) may store other information. For example, the data repository (104) may store graphical input (130) that is computer readable to designate the start point (122) and the endpoint (124). The graphical input (130) may take the form of a user directly manipulating the map (114), but may also be received via some other user input device, or possibly previously stored and loaded when the aircraft arrives at or is otherwise located at the airport.

The data repository (104) also stores a relational database (132). The relational database (132) is a computer data structure that stores computer-readable information. In particular, the relational database (132) stores information that defines points and edges for the map (114) of the airport taxiways (116). Thus, in an embodiment, the relational database (132) may be used to store some or all of the map information (112).

With respect to the path generation program (126), the computer readable program code (110) may include code executable to convert the relational database (132) into a graph database (134), such as a directed graph. In this manner, the path generation program (126) can generate the path (120) by querying the directed graph.

In a specific example, conversion of the relational database (132) into the graph database (134) may be performed by generating a base layer (136). The base layer (136) is an initial directed graph, prior to being corrected and finalized. The base layer (136) is generated by importing and normalizing taxiway guidance lines, taxiway holding positions, runway exit lines, and runway centerlines, and assigning persistent identifiers using edges between points in the relational database (132).

The data repository (104) may store not only the base layer (136), but also a corrected base layer (138). The corrected base layer (138) is generated by correcting, automatically, the base layer (136). Correction of the corrected base layer (138) is described with respect to FIG. 2A through FIG. 2K.

Both the base layer (136) and the corrected base layer (138) may include nodes and edges, such as node (140) and edge (142) in the corrected base layer (138). A node is a location in the map information (112). An edge (142) is a connection between two nodes.

Returning to the computer readable program code (110), the code may also include a GUI update program (144). The GUI update program (144) is executable to updating a keyboard on the GUI (108) based on the path (120) generated. Thus, for example, as certain nodes and edges (e.g. waypoints, destinations, and possible paths) change as a user is entering requirements for the path (120), then those portions of the map (114) that no longer fit the constraints for the optimal path (120) are no longer displayed. Thus, for example, certain waypoints or nodes may be grayed out or not displayed at all so that the user does not accidentally select options which are no longer available. Options might not be available due to constraints imposed by an air traffic controller, by rules or regulations, by the selection of the user, or by a policy (such as to minimize the distance between nodes). The process of generating a revised keyboard or other portion of the GUI (108) is described with respect to FIG. 2A through FIG. 2K.

As indicated above, the data repository (104) may also store one or more constraints (146). A constraint, as indicated above, is any rule or policy which limits options for generating the path (120). Thus, the path (120), when generated, will obey the one or more constraints (146).

While FIG. 1 shows a configuration of components, other configurations may be used without departing from the scope of the one or more embodiments. For example, various components may be combined to create a single component. As another example, the functionality performed by a single component may be performed by two or more components.

FIG. 2A, FIG. 2B, FIG. 2C, FIG. 2D, FIG. 2E, FIG. 2F, FIG. 2G, FIG. 2H, FIG. 2I, FIG. 2J, and FIG. 2K are flowcharts of methods for implementing an automated process for determining and displaying a taxi route on a GUI, in accordance with one or more embodiments. The methods described with respect to FIG. 2A through FIG. 2K may be implemented using the system of FIG. 1 and/or the computing system and network shown with respect to FIG. 7A and FIG. 7B. The various operations described with respect to FIG. 2A through FIG. 2K are thus performed automatically by one or more computer processors.

Step 200 includes displaying, in a graphical user interface (GUI) of a computer, a map of airport taxiways. The map is displayed using a rendering application that takes map information and displays a map representative of the layout of the taxiways.

Step 202 includes receiving a start point on the map. The start point may be received from a user graphically manipulating the GUI, by a user entering map coordinates or a starting location via a user input device, or from an automatically program or process. An example of an automatic process may be a program that uses a global positioning system (GPS) device on the aircraft that places the current location of the aircraft on the map when the aircraft lands or arrives at the airport, or when the aircraft begins or is preparing to begin to taxi to or from a runway. Another example of an automatic or partially automatic process may be for an air traffic controller or control system to transmit the start point and/or any path constraints to the system.

Step 204 includes receiving an endpoint on the map. The endpoint may be received in a manner similar to receiving the start point.

Step 206 includes generating, automatically, a path for an aircraft to take to navigate the plurality of taxiways from the start point to the endpoint. Generating the path may be performed by traversing a graph data structure of the map information. The graph data structure may be constructed from a relational database of the map information, as explained with respect to FIG. 5. The graph data structure may also be constructed from an image of a map of the airport. Other data structures and methods for generating data structures may be used.

Step 208 includes superimposing the path on the map in the GUI. The path may be superimposed according to a number of different methods. For example, a path on the map can be highlighted or otherwise pointed out. A colored or shaded or hashed line or pattern can be superimposed on the relevant taxiways, runways, ramps, etc. along which the aircraft is routed.

In one embodiment, the method may terminate thereafter. However, the method of FIG. 2A may be extended or varied.

Figure 2A:
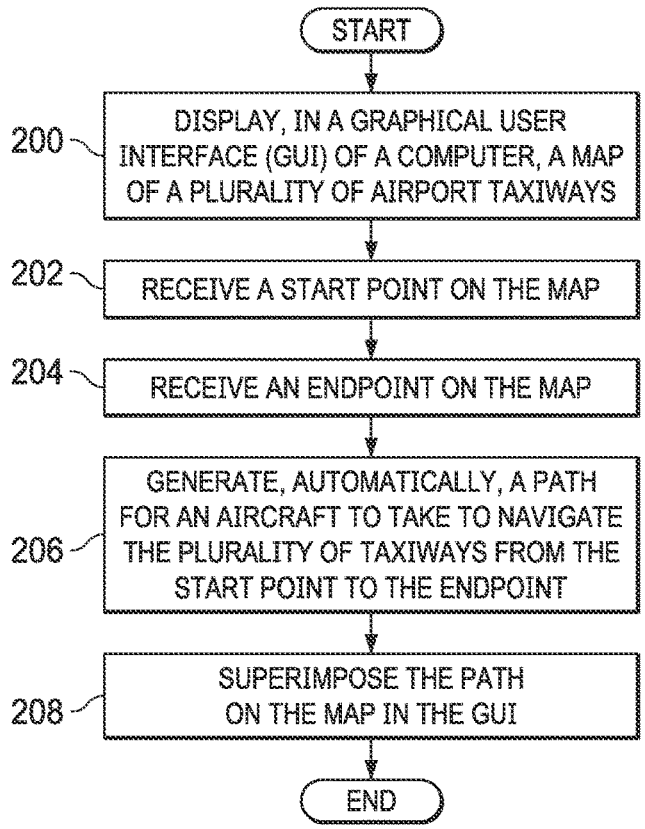
FIG. 2A, FIG. 2B, FIG. 2C, FIG. 2D, FIG. 2E, FIG. 2F, FIG. 2G, FIG. 2H, FIG. 2I, FIG. 2J, and FIG. 2K are flowcharts of methods for implementing an automated process for determining and displaying a taxi route on a GUI, in accordance with one or more embodiments.
Figure 2B:
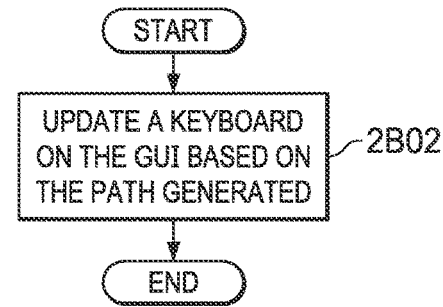
Figure 2C:
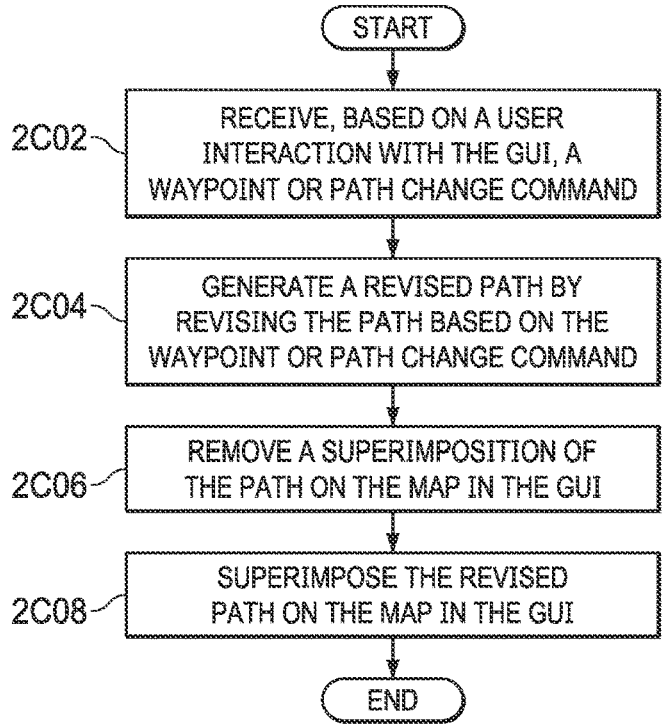
Figure 3A:
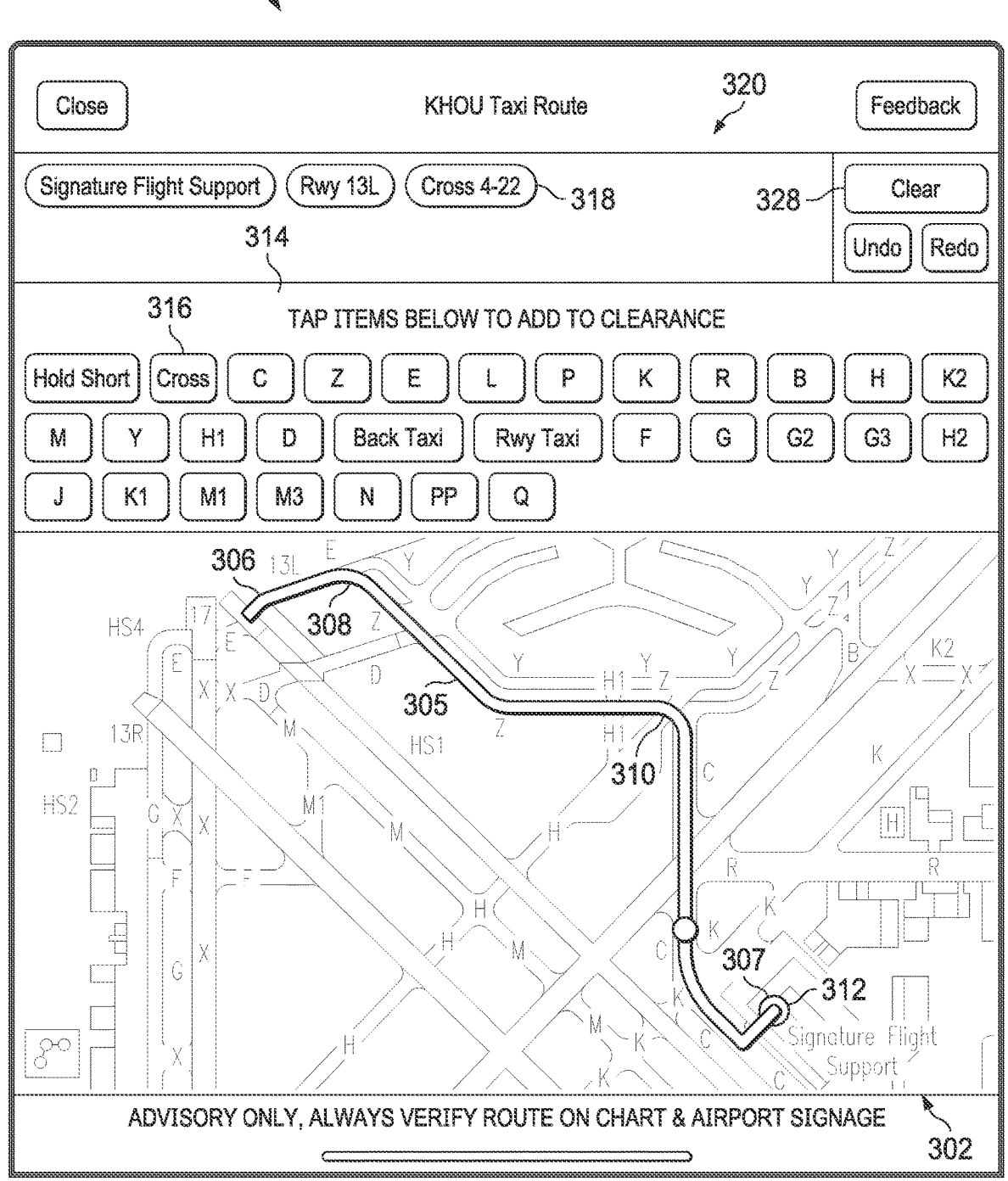
FIG. 3A and FIG. 3B are sample screenshots showing the automatic calculation and display of a taxi route on a GUI, together with updating widgets on the GUI based on user input, in accordance with one or more embodiments.
Figure 3B:
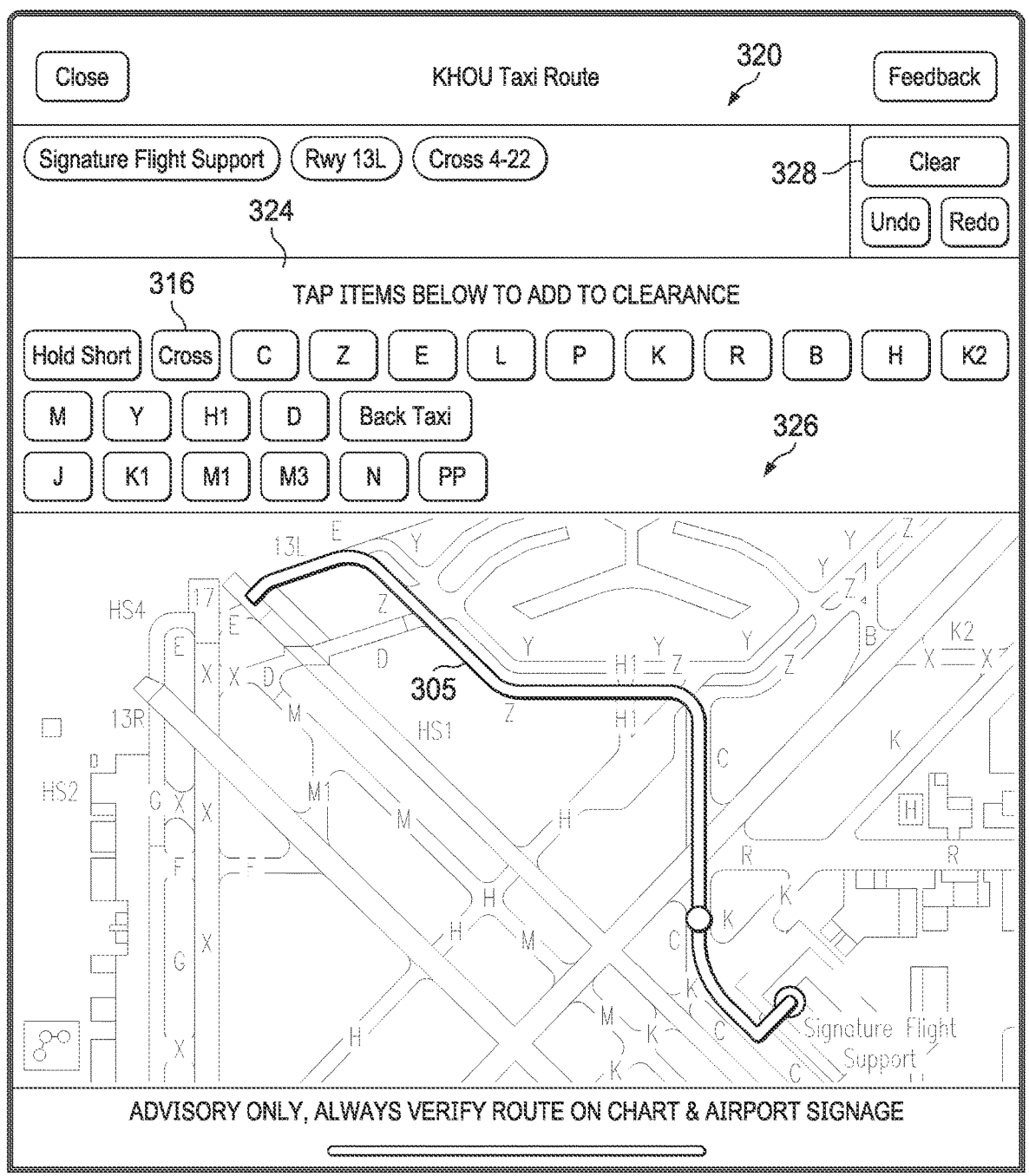

For example, FIG. 2B may be performed at any point after step 202 in the method shown in FIG. 2A. FIG. 2B includes, at step 2B02, updating a keyboard on the GUI based on the path generated. The term "based on the path generated" specifically contemplates steps that are part of the path being generated, such as for example receiving the start point. Thus, for example, entering the start point, the endpoint, or any other constraints may cause the keyboard displayed on the GUI to be changed. For example, waypoints restricted by receipt of information can be removed from the GUI, or waypoints that become available based on new information can cause keyboard commands to be added to the GUI. An example is shown in FIG. 3A and FIG. 3B.

The update of the keyboard, or other dynamic changes to the GUI, may be accomplished by using a graphics and/or rendering program to add or delete widgets from the GUI as restricted or possible path options are removed or become available. Additionally, the shape, look, feel, and method of highlighting a path can also change dynamically with new information. For example, if the user sets a waypoint, then the highlighted path might change color or shape. Additionally, multiple options for paths might be shown.

The method of FIG. 2A may also be performed dynamically. In other words, the method of FIG. 2A may update the path as new information is received.

For example, step 2C02 includes receiving, based on a user interaction with the GUI, a waypoint or path change command. The waypoint or path change command may be received via the user interacting with the GUI. For example, the user might interact with the updating keyboard and select waypoints, start or endpoints, or issue other commands. The waypoint or path change command may be requested or imposed by an air traffic controller.

Step 2C04 includes generating a revised path by revising the path based on the waypoint or path change command. The revised path may be generated by re-traversing a graph database, as described above. The revision is based on the waypoint or path change command in that the waypoint or path change command changes how the graph database is traversed in order to connect the start point to the endpoint, while including the waypoint or path change command and any instructions or policies imposed on how the graph database is traversed.

Step 2C06 includes removing a superimposition of the path on the map in the GUI. The superimposition may be removed by no longer highlighting the originally highlighted path. In some embodiments, step 2C06 may be skipped. In this case both the previously presented and the revised path will be highlighted the GUI. Highlighting both paths may be useful to the pilot for comparison purposes.

Step 2C08 includes superimposing the revised path on the map in the GUI.

The revised path is superimposed on the GUI in a method similar to that performed at step 208 in FIG. 2A.

Figure 2D:
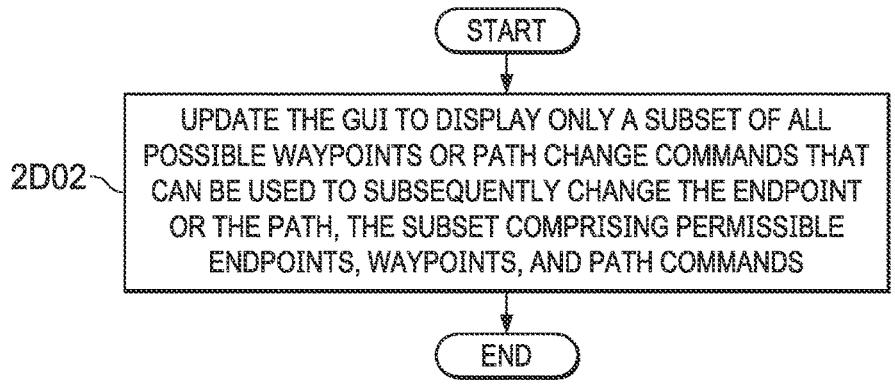

In the variation of FIG. 2D, other aspects of the GUI may be updated as the user interacts with the GUI and the path is updated. For example, step 2D02 includes updating the GUI to display only a subset of all possible waypoints or path change commands that can be used to subsequently change the endpoint or the path, the subset comprising permissible endpoints, waypoints, and path commands. In other words, the map itself is updated so that only selectable waypoints, etc. are displayed once certain start points, endpoints, or other waypoints are set. The user is able to clear such automatic updating in order to see all available options again.

Figure 2E:
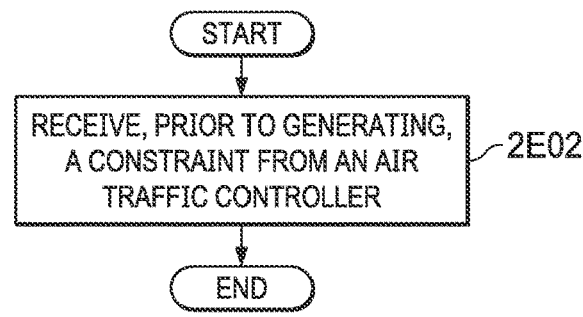
Figure 2F:
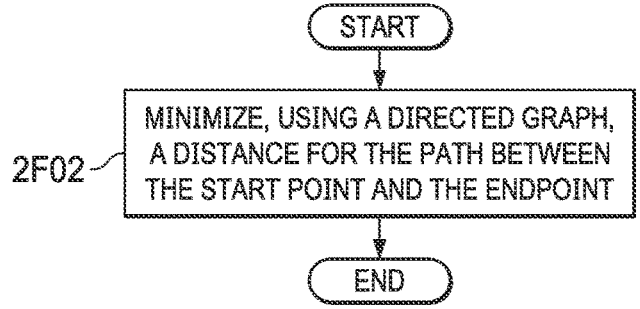
Figure 2G:
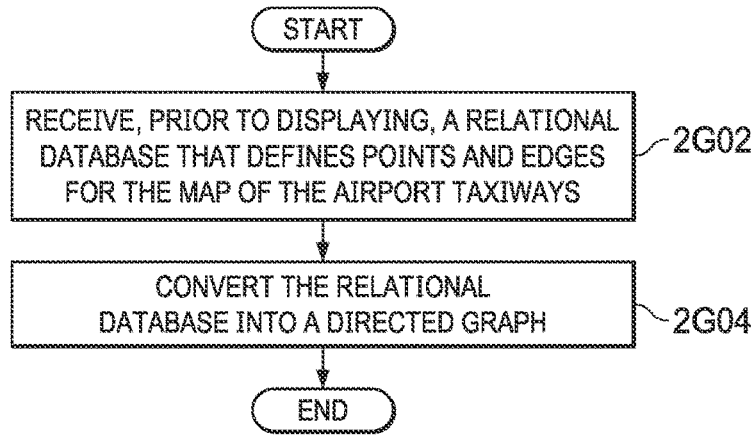
Figure 2H:
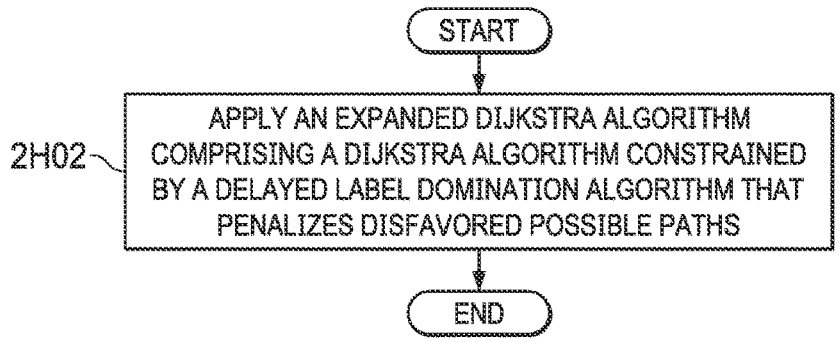

Referring to FIG. 2E, in another variation of FIG. 2A, step 2E02 includes receiving, prior to generating, a constraint from an air traffic controller. The constraint could also be received from other sources. The constraint is received via a wireless communication. Once received, generating the path further includes generating the path to obey the constraint. In this manner, an air traffic controller may control how a pilot will navigate the taxiways of the airport. In an embodiment, paths that are fully or partially controlled by an air traffic controller may be highlighted with different colors or markings so that the pilot knows that selecting a certain path, or avoiding certain paths, are required at the airport at that time.

The one or more embodiments may also be used to shorten the distance traveled along the taxiways from the start point to the endpoint. For example, referring to FIG. 2F, part of generating the path at step 206 of FIG. 2A may include, at step 2F02, minimizing, using a directed graph, a distance for the path between the start point and the endpoint.

The method of FIG. 2A may also include pre-processing operations. For example, referring to FIG. 2G, step 2G02 includes receiving, prior to displaying, a relational database that defines points and edges for the map of the plurality of airport taxiways. The relational database may be received by accessing a local hard drive, by requesting the relational database from a remote source, or even by generating the relational database from pictorial map information.

Step 2G04 includes converting the relational database into a directed graph in order that generating the path can be performed by querying the directed graph. Converting the relational database into a directed graph may be performed according to a number of different methods. For example, a computer can be programmed to convert the relational representation from one database to the other. More specifically, the foreign keys of a relational data model can be used to build edges, thus transforming loosely coupled data records into a bounded group of nodes. Nodes form the basis of graph database architecture, and edges are the connections between the nodes.

Once the graph data structure is formed, the method of generating the path may be varied. For example, referring to FIG. 2H, generating the path at step 206 of FIG. 2A may be performed at step 2H02 by applying an expanded Dijkstra algorithm, which is a Dijkstra algorithm constrained by a delayed label domination algorithm that penalizes disfavored possible paths. The disfavored possible paths comprise those paths that violate a constraint. The delayed label domination algorithm operates by not allowing label (calculated edge) domination if the dominating label (based on cost) has a superset of the remaining taxiways (constraints) to visit compared to the dominee label. Only if the dominating label has the same or fewer remaining taxiways to visit is the label under consideration allowed to dominate the other label that has greater cost.

Attention is now turned to a more technical representation of the delayed label domination algorithm A label under consideration that has a lower cost to a point cannot dominate another label with greater cost, if the label under consideration has a superset of constraints (visited taxiways) compared to the label with greater cost. This policy ensures that the cleared taxiways are visited, and visited in the correct order.

For example, assume Label A has a target in node x with a cost of 100 (units are not important for this example). The cleared taxiways not visited are C1 and D1. Further assume label B with a target in node x with a cost of 120. The cleared taxiways not visited are D1.

When label A is created, label A is compared to other labels that have a target in x. Normally, in a Dijkstra algorithm, label A could dominate label B as label A as a lower cost. However, as label A has a superset of constraints (not visited C1 and D1) compared to label B (not visited tax way D1), it is not guaranteed that label A will result in the shortest path that visits all the cleared taxiways. Thus, label A cannot dominate label B.

In this case, both labels will be kept open in the search. If label A also just needed to visit taxiway D1, label A could dominate label B, as the two labels have the same missing restrictions. The same result would apply if label A did not have any missing cleared taxiways in the path.

Figure 2I:
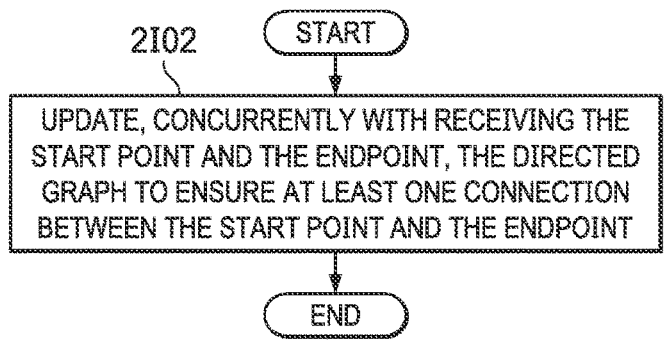

In another variation, referring to FIG. 2I, step 2I02 may include updating, concurrently with receiving the start point and the endpoint, the directed graph to ensure at least one connection between the start point and the endpoint. In other words, if no path exists between the start point and the endpoint, the graph may be updated to ensure a path of one or more edges exists between the start point (i.e., start node) and the endpoint (i.e., end node). An example of this procedure is shown in FIG. 6A through FIG. 6H.

Different techniques may also be used to convert a relational database into the directed graph, other than those mentioned above. For example, referring to FIG. 2J, step 2J02 includes generating a base layer by importing and normalizing taxiway guidance lines, taxiway holding positions, runway exit lines, and runway centerlines, and assigning persistent identifiers using edges between points in the relational database. Step 2J02 may be accomplished using an automated algorithm.

Step 2J04 includes generating a corrected base layer by correcting, automatically, the base layer. The corrected base layer may be generated by a number of different means, including one or more of the following. The corrected base layer may be generated in whole or part by replacing an incomplete section of the directed graph by forcing approaching edges to meet at a corresponding node. The corrected base layer may be generated in whole or part by removing an invalid edge or an invalid node. The corrected base layer may be generated in whole or part by renaming an unknown label. The corrected base layer may be generated in whole or part by receiving a manual correction to the base layer. A combination of any of these actions also may be taken.

Step 2J06 includes generating nodes and edges from graphical data in the corrected base layer. The nodes and edges may be generated, as described above, by using the foreign keys of a relational data model to build edges, thus transforming loosely coupled data records into a bounded group of nodes. Nodes form the basis of graph database architecture, and edges are the connections between the nodes.

Step 2J08 includes verifying that the nodes and edges are connected and routable. In other words, the graph is traversed multiple times to ensure that each node is connected to at least one other node via at least one edge. In this manner, a path can be selected from any one node to any other single node by at least one path.

Step 2J10 includes exporting the nodes and edges as the directed graph. Exporting may be performed by saving the nodes and edges in the form of a directed graph. However, alternatively, exporting may be performed by converting the directed graph into some other data structure (such as another relational database or a compressed file) and then re-integrating or expanding the other data structure when the directed graph is to be used.

Figure 2K:
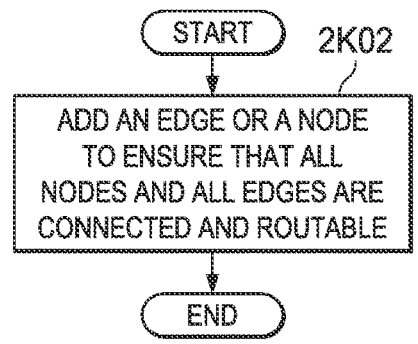
Figure 2J:
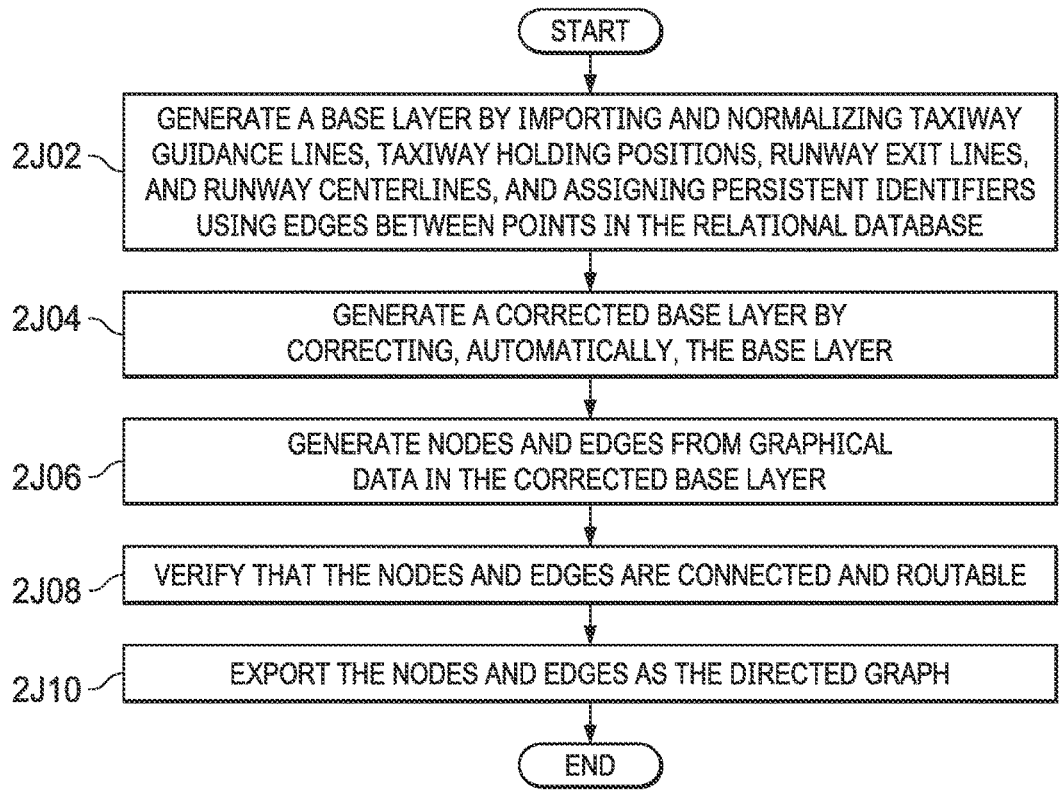

As an example of correcting a base graph, or as a variation of verifying at step 2J08 of FIG. 2J, refer to FIG. 2K. Step 2K02 includes adding an edge or a node to ensure that all nodes and all edges are connected and routable. For an example, an edge can be added between two nodes when graphical data indicates that two nodes can be connected by an edge, even when the relational database did not show the existence of the edge. Alternatively, or in addition, a node may be added to the graph so that two edges may be connected, perhaps in a manner different than that originally presented in the base layer. Again, graphical data may be used to add nodes where appropriate, and then to ensure that edges from added nodes are appropriate. In some cases, such as when a relational database contains old information, one or more nodes may be deleted when generating the corrected base graph.

Other variations of the method of FIG. 2A through FIG. 2K are now described, beginning with a summary. The algorithm of the one or more embodiments calculates the path from the current location of the aircraft to a destination, using the taxiways for the selected airport. The data foundation may be a SQLITE® relational database that contains points and edges for the airport, including names and types of the edges. The data is converted into a graph (e.g., an adjacency list) which is static for the airport.

The graph is reused for all calculations for the selected airport. The shortest path calculation is performed using a Dijkstra algorithm. The Dijkstra algorithm calculates the path from the selected source location to the selected target location. The source and target locations are often custom locations and are connected dynamically to the static graph.

The shortest path can take multiple cleared taxiways as constraints, which the algorithms routes. The order of the taxiways is followed in the path. If no route could be found using the order of the taxiways, the algorithm will fall back to a solution where no taxiways are used as via parts, but simply the shortest path is found.

The Dijkstra algorithm of the one or more embodiments is expanded with a delayed label domination algorithm, as described above with respect to FIG. 2H, to ensure that the shortest path using the cleared taxiways are used. However, other approaches could be used.

For example, the one or more embodiments contemplate dividing the path finding into multiple path findings with each cleared taxiways as a target using a tree data structure, rather than a directed graph. However, as there are many edges for a single taxiway, that approach may not generate a solution in all cases. A different approach could be to increase cost on all edges other than the cleared taxiways, but that approach also does not guarantee a complete solution in all cases.

To guarantee that the taxiways are used in the correct order, the delayed label domination algorithm may be used. As mentioned above, the delayed label domination algorithm works by not allowing label (calculated edge) domination if the dominating label (based on cost) has a superset of the remaining taxiways (constraints) to visit compared to the dominee label. Only if the dominating label has the same or fewer remaining taxiways to visit it is allowed to dominate the other label that has greater cost.

The path finder has a set of restrictions that is used to calculate the cost of the label, in order to affect how the path is found. The restrictions are described below. If an initial heading is provided (when landing at a runway), the algorithm will prefer to continue the path in that direction for a while, to avoid sharp turns on the runway when landing. Edges that have sharp angles compared to the initial heading while still being on the runway, or close to the source location, are penalized.

If a runway is set as the target, then an intersection takeoff should be performed. When a path is found to the runway specified for intersection takeoff, the path is marked and the remaining labels from that label to the target are assigned a lower cost.

When the shortest path has been found to the target, with the runway specified for intersection takeoff, the edges in the path after the label marked as intersection takeoff, are removed. Thus, the path stops when the runway for intersection takeoff is found.

Hold short locations are added to each label to indicate where on the path there are "hold shorts". A "hold short" is an air traffic control procedure. An aircraft stops taxing ("holds short") at an intersecting runway, or a point on a runway, to balance airport capacity and system efficiency. A hold short clearance may also be issued when a taxiway crosses a runway or when multiple taxiways intersect.

Connected taxiways are calculated after the shortest path is found in order to indicate which taxiways are nearby the path found. The application uses the connected taxiways to suggest which taxiways are most likely to get cleared based on the currently found path.

The application also uses a breadth-first search algorithm (BFS) to find the nearby connected taxiways up to a predetermined distance (e.g., 500 feet) from the current path. When finding a connected taxiway that is different from a taxiway in the current route, the search in that branch in the search tree stops. Thus, only one connected taxiway will be found for each distinct path from the current path.

Debug information is added to the result. The debug information indicates edges and their cost for the found path.

The algorithm of the one or more embodiments may be subject to one or more restrictions to improve the path found to obey constraints imposed by an air traffic controller or expected aircraft operation practice. For example, cleared taxiways (via parts) are given a lower weight than other labels. In another example, changing taxiways is penalized in order to minimize the number of taxiway transitions. In still another example, using an unnamed edge (non-taxiway) is penalized. In yet another example, using sharp turns is penalized. In a further example, using a runway is penalized if the runway is not cleared for back taxi operations. In a still further example, recursive paths where an edge that has already been visited are penalized. In a yet further example, if the order of the cleared taxiways is opposite of the shortest path, the shortest path is overridden. In addition, hold short commands may also form additional restrictions, such as for taxiway transitions (hold short locations for transitions in a taxiway), runway hold shorts (hold short locations for crossing a runway) and taxiway crossings (hold short locations for crossing other taxiways). Other restrictions are contemplated.

Still other variations are possible. Thus, while the various steps in the flowcharts are presented and described sequentially, one of ordinary skill will appreciate that some or all of the steps may be executed in different orders, may be combined or omitted, and some or all of the steps may be executed in parallel. Thus, the one or more embodiments are not necessarily limited by the examples provided herein.

FIG. 3A through FIG. 6H present specific examples of the techniques described above with respect to FIG. 1 through FIG. 2K. The following example is for explanatory purposes only and not intended to limit the scope of the one or more embodiments.

Attention is now turned to FIG. 3A and FIG. 3B, which are sample screenshots showing the automatic calculation and display of a taxi route on a GUI, together with updating widgets on the GUI based on user input, in accordance with one or more embodiments. FIG. 3A and FIG. 3B should be considered together. The screenshots described with respect to FIG. 3A and FIG. 3B may be generated using the system of FIG. 1, the methods of FIG. 2A through FIG. 2K, and/or the computing system and network shown with respect to FIG. 7A and FIG. 7B.

Screenshot (300) includes a map (302) of a taxiway system, including runways, taxiways, ramps, terminals, parking areas, and hangars. A path (305) is defined and highlighted between an endpoint (306) and a starting point (307). The path (305) takes several turns due to observation of several waypoints, such as waypoint (308) and waypoint (310), that were imposed on the path selection. The waypoints could be selected for a number of reasons, including waypoints that enforce a shortest path between source point and endpoint, waypoints selected by the user, waypoints imposed by an air traffic controller, or possibly other sources. In an embodiment, waypoints selected by the user appear in the display window (320). A current location of the aircraft (312) is shown as a highlighted circle in the embodiment of FIG. 3A, though other methods of showing the current location of the aircraft (312) are possible.

The GUI shown in the screenshot (300) also includes an interactive keyboard (314) as part of the GUI. The interactive keyboard (314) includes a number of widgets, such as widget (316). A widget is a button, lever, scroll bar, etc. that allows a user to interact with the GUI shown in the screenshot (300). Thus, for example, the user could select widget (316) as a constraint or a desired waypoint. The selection is shown as entry (318) in the display window (320). As a result of the section of the widget (316), the path (305) is updated.

Addition, with attention turning to FIG. 3B, the interactive keyboard (314) can also be updated with different selections of the widgets, entries of information into the display window (320), or constraints received from an air traffic controller or other data source. In the example of FIG. 3B, the subsequent screenshot (322) shows that the adjusted keyboard (324) now includes an area (326) where widgets have been removed. The widgets were removed because the selection of widget (316) made the commands of the widgets in the area (326) unavailable due to constraints on the path (305) that arose once the widget (316) was selected. In this manner, the user can more quickly ascertain available options for further refining the path (305).

The user may use a "clear" widget (328) to clear the display window (320), thereby resetting all available options, though doing so may cause the path (305) to disappear. As the user provides more data or instructions, such as the entry of start points, endpoints, or waypoints, the path (305) is continuously updated. Optionally, alternative multiple paths between two points can be shown, and the user can interact with the GUI show in the subsequent screenshot (322) to select which path the user would like to take.

The edit view shown in FIG. 3A and/or FIG. 3B allows the GUI to alter and visualize the taxi route for a given airport. At the top of the view are the elements currently in the taxi route. Each bubble can be tapped to expose a "remove" action.

To the right of those bubbles are the clear, undo and redo buttons. The clear button removes all route elements. The undo/redo work changes the most recent edits made to those elements. Undo/Redo can be set to work for the current editing session (if the user closes and re-opens the edit view the history of changes tracked for undo/redo is reset).

Below the taxi route element bubbles is the smart keyboard. The smart keyboard prompts for either locations to add to the taxi route or paths. A taxi route first has two locations added to it: the starting and ending points. If the ownship is on the airport property, it will be automatically assumed to be the starting point (and is not shown as an element bubble). Otherwise the first location added via the smart keyboard will be the start point. The next location added will be the endpoint (e.g., the destination).

Once two locations have been added, an auto-calculated path will show on the map. Then, the smart keyboard will start showing path options to add, like taxiways or back-taxi instructions. The expectation is that pilots will type their clearance from ground control (or other airport authority) directly into this route editor in the same order it is given by air traffic controller, though such information may be automatically entered from data provided by the air traffic controller.

Just above the smart keyboard is text explaining what route element is needed next (start, end, or clearance elements). Locations shown as options in the smart keyboard include runway ends, fixed base operators, and user waypoints that are on the airport.

If the ownship is not on the airport, and a runway is selected as the starting location, then the editor assumes that the runway is being used for landing. In that case, the route may start about halfway down the runway, in the direction of the runway. This feature is useful when flying and attempting to approximate the taxi path at the airport while in descent or landing procedures.

The map view at the bottom of the edit view serves as a visual aid. Tapping on the map may or may not be supported, and pan or zoom gestures may be programmed.

The feedback button grabs a screenshot of the current edit view and prompts the user to email that information, along with any notes on concerns the user has. If the user does not have an e-mail account available, then a standard share sheet may be shown on the GUI so the user can use some other email application or other message service to send the feedback.

When the route is complete, the edit view can be dismissed as the route is auto-saved. The route will then be shown on the main map and on any airport diagram for that airport. The route will continue to be shown on those places until the user clears the route in the edit view.

Routes may be persisted. In other words, if the application is stopped and then later restarted, the application will auto-restore any taxi routes established less than a predetermined time prior to application restart.

Figure 4A:
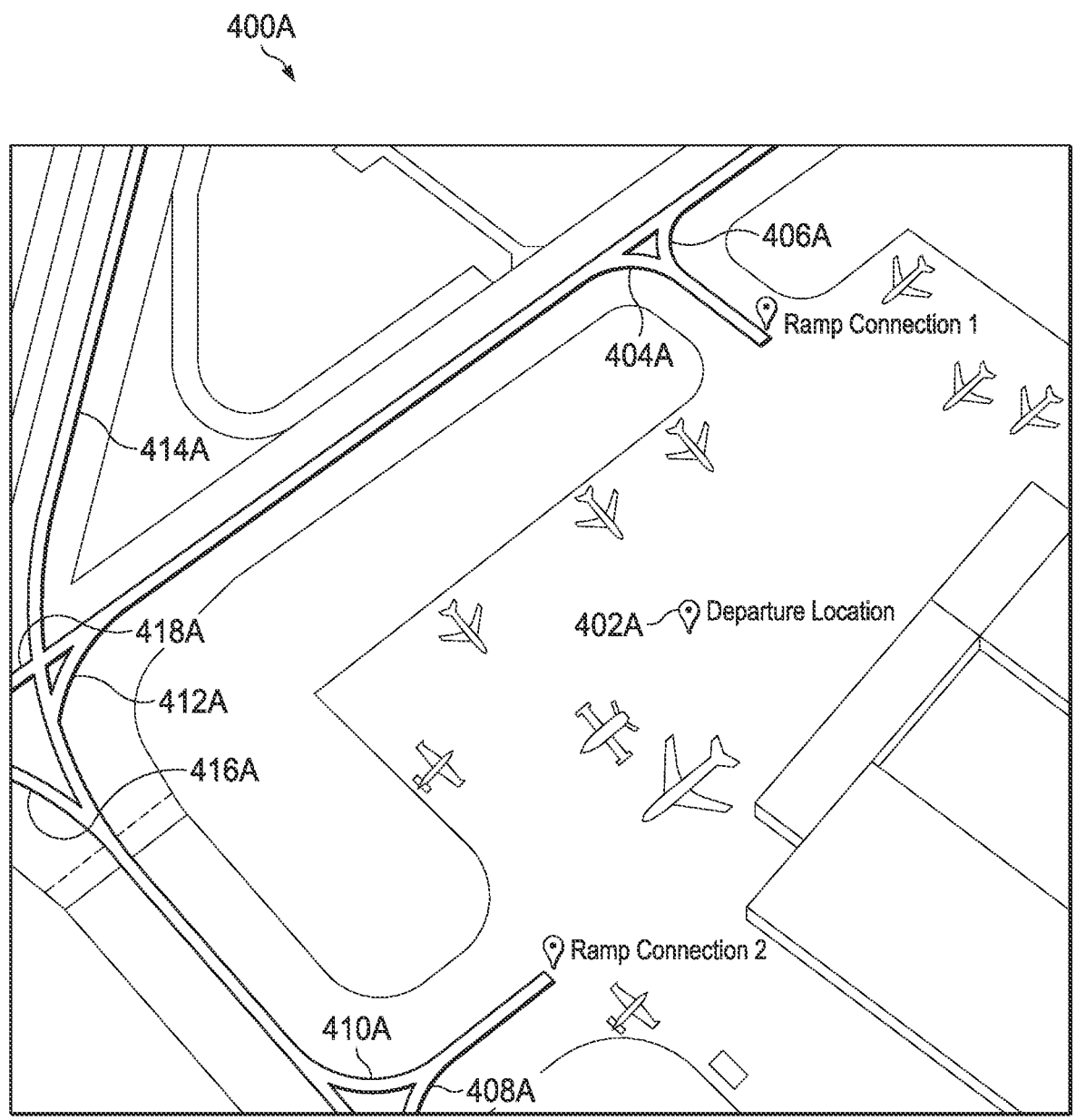
FIG. 4A and FIG. 4B are sample screenshots showing the automatic calculation and display of a taxi route on a GUI, in accordance with one or more embodiments.
Figure 4B:
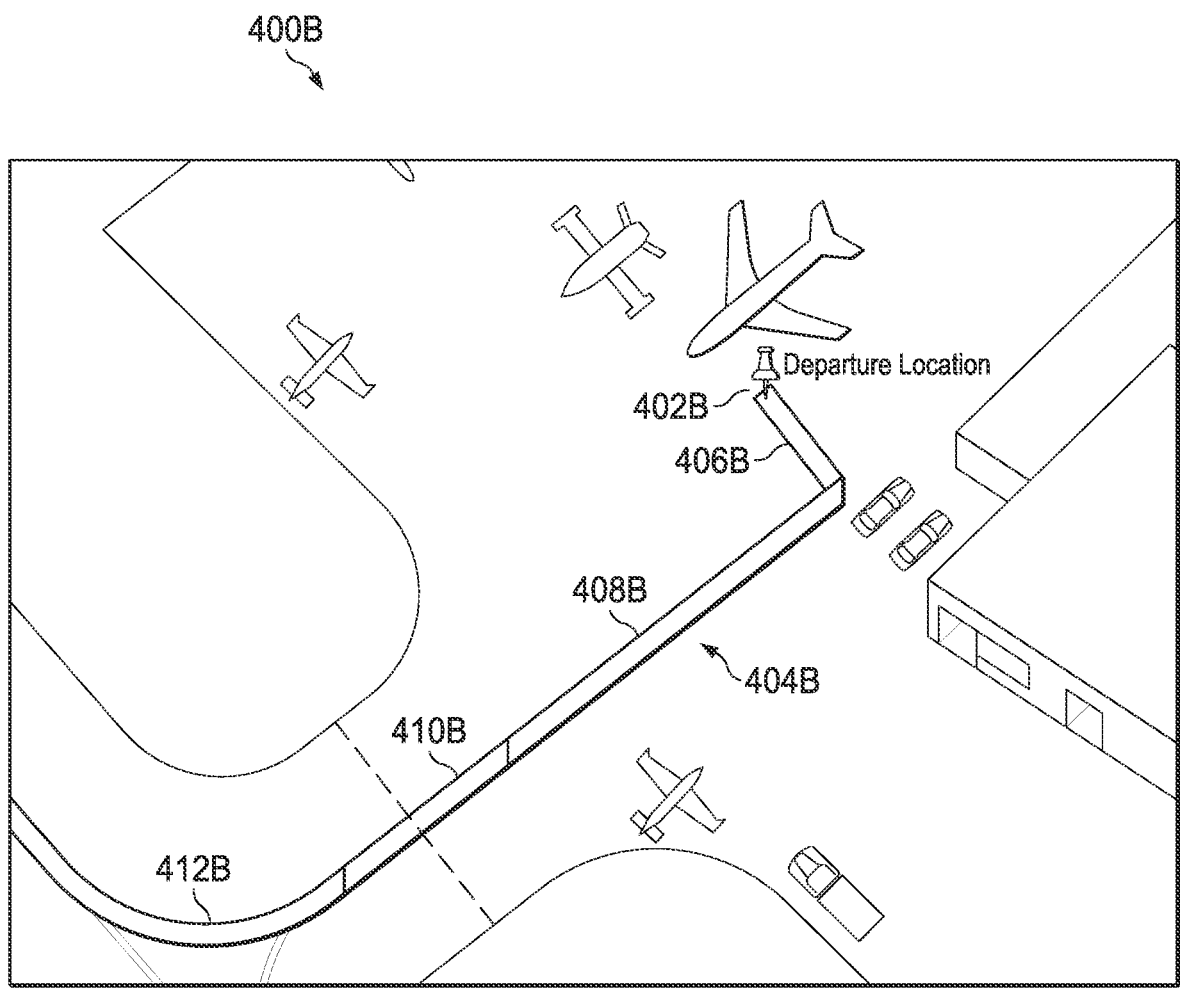

Attention is now turned to FIG. 4A and FIG. 4B, which are sample screenshots showing the automatic calculation and display of a taxi route on a GUI, in accordance with one or more embodiments. FIG. 4A and FIG. 4B should be considered together. The screenshots described with respect to FIG. 4A and FIG. 4B may be generated using the system of FIG. 1, the methods of FIG. 2A through FIG. 2K, and/or the computing system and network shown with respect to FIG. 7A and FIG. 7B.

FIG. 4A shows screenshot (400A). Screenshot (400A) shows an image of a portion of an airport. Thus, unlike screenshot (300) of FIG. 3A, the one or more embodiments may show only expanded or zoomed portions of an airport, rather than the entire airport taxiway system. FIG. 4A is an example of dynamic connections between two ramp connections.

In the example of FIG. 4A, the departure location (402A) (i.e., start point) is shown as being generally in the area of a parking area near a hangar. The destination location (i.e. endpoint) is not shown, being outside of the zoomed area shown in screenshot (400A). Multiple viable paths from the departure location (402A) to the endpoint (not shown) are available in the example of FIG. 4A, such as path (404A), path (406A), path (408A), path (410A), path (412A), path (414A), path (416A), and path (418A), each highlighted as shown.

From a technical perspective, the departure location (402A) and destination location (not shown) are connected dynamically to the static graph in order to allow the departure location (402A) to be the current location of the aircraft and the destination location to be a custom specified location at the airport. In order to determine to where the departure location (402A) and destination location (not shown) should be connected, a distance is calculated from the locations to all edges in the static graph. The distance is calculated by calculating the distance to the source and target nodes of each edge, adding both distances and subtracting the length of the edge. The resulting distance is lower for edges where both the edge source and target is close to the corresponding location (departure location (402A) or destination location (not shown)). Hence, a distance of zero is given to edges where the location is located directly between the edge source and target.

The nearest edges (with their corresponding distance to the departure location (402A) or destination location (not shown)) is then used to determine which of the edges should be used and how many. If the nearest edge is on a taxiway or runway, only that edge will be used for connection to the departure or arrival. If the nearest edge has either source or target of the edge to have an outdegree of 1 (not connected to any other edges), then in this case this edge is a ramp connecting edge. When a ramp connecting edge is detected, the application will search for other ramp connecting edges no longer than the distance to the first edge plus a set distance (e.g., 1000 feet). Thus, the ramp can connect to multiple taxiways if the aircraft and/or the departure location (402A) are close to any given ramp, relative to a size of the area in which the aircraft is located.

FIG. 4B shows screenshot (400B). Screenshot (400B) shows another image of a portion of an airport, in this case zoomed in even further relative to screenshot (400A) of FIG. 4A. FIG. 4B is an example of a departure location (402B) connected to a ramp location.

The departure location (402B) is shown in the parking area shown. The departure location (402B) in FIG. 4B has moved relative to the departure location (402A) in FIG. 4A. The departure location (402B) has moved from the departure location (402A) to better illustrate the connectivity between path segments, and also because the individual aircraft being tracked has moved within the parking area between FIG. 4A and FIG. 4B.

FIG. 4B also shows that the path (404B) may be broken up into differently highlighted segments for various reasons, including path segment (406B), path segment (408B), path segment (410B), and path segment (412B). Continuing the technical description of FIG. 4A, when the nearest edge(s) in the graph representing the departure location (402B) and the destination location (not shown) have been found, the nearest edges in the graph will be connected to the departure location (402B) and the destination location (not shown). In particular, a point on the nearest edge(s) is found that will result in a perpendicular edge when connected to the departure location (402B) or destination location (not shown). In the case where it is not possible to find a location on the edge that will result in a perpendicular edge, a point on the extrapolated path is assigned if the edge will be used to find a perpendicular edge.

In the example of FIG. 4B, path segment (412B) is a taxiway, path segment (410B) is a ramp connection, and path segment (408B) is an extrapolated edge from the ramp connection (i.e. path segment (410B)). The path segment (406B) is the perpendicular edge described above.

Figure 5:
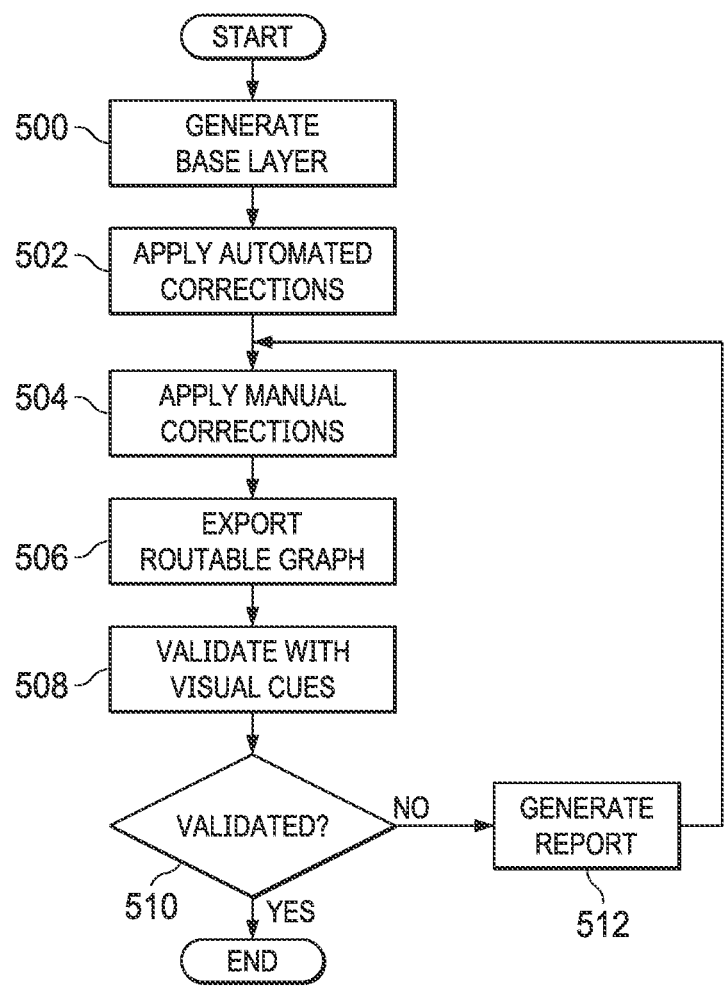
FIG. 5 is a method for generating a graph database useable for automatic calculation of taxi routes as shown in FIG. 3A through FIG. 4B, in accordance with one or more embodiments.

Attention is now turned to FIG. 5, which is a method for generating a graph database useable for automatic calculation of taxi routes as shown in FIG. 3A through FIG. 4B, in accordance with one or more embodiments. The method of FIG. 5 represents one possible technical means for automatically generating a display of a selected route on a graphical user interface (GUI) displaying an airport's system of runways, taxiways, ramps, terminals, parking areas, and/or hangars. Other types of data structures are contemplated by the one or more embodiments, including other types of databases, linked lists, objects, etc. Thus, the example of FIG. 5 does not necessarily limit the one or more embodiments. The techniques described with respect to FIG. 5 may be implemented using the system of FIG. 1, the methods of FIG. 2A through FIG. 2K, and/or the computing system and network shown with respect to FIG. 7A and FIG. 7B.

At step 500 includes generating a base layer. The base layer is generated by converting a relational database into an initial graph database, as described above.

Alternatively, the base layer is created by importing source data from an airport mapping database (AMDB), which is a specific kind of relational database. The imported taxiway guidance lines, taxiway holding positions, runway exit lines, and runway centerlines are normalized and assigned persistent identifiers. The identifiers are calculated using edges, geometric shape, and identifying features in the database. The identifiers are used for the corrections at step 502 in order to perform layering correctly and to allow manual corrections to persist through cycles of source data.

Step 502 includes applying automated corrections. As indicated above in FIG. 2A through FIG. 2K, the base graph may benefit from corrections. It is anticipated that frequently the base graph will benefit from corrections because graphs generated from just the base layer are usually incomplete and unoptimized.

The corrections act as instructions for the export process, providing instructions to delete, update, or create from scratch taxiway edges without modifying the source layer. There are two main categories of automated corrections: replacing incomplete sections and renaming unknown labels. Examples of replacing incomplete sections are shown in FIG. 6A through FIG. 6D. Examples of renaming unknown labels are shown in FIG. 6E and FIG. 6F.

Step 504 includes applying manual corrections. There are some cases where sufficient information to generate a correction is missing. Manual corrections can be made by a technician, or input from some other automated process, to improve generation of a routable graph for an airport. Unlike the automated corrections or the base layer, the manual corrections are applied indefinitely, or until the base layer does not support certain manual corrections.

Step 506 includes exporting the routable graph. To export the routable graph, the base layer and corrections layers are combined. The graphical data from each edge is then used to generate routable nodes and edges. An example of routable nodes (major and minor) and edges is shown in FIG. 6G.

Step 508 includes validating the routable graph with visual cues. An example of the visual cues are given in FIG. 6H. Validation at step 508 tests if the exported graph is fully connected and routable. Validation is performed by multiple passes of the graph to ensure that any given endpoint can be reached from any given destination point.

Step 510 includes determining whether the graph was successfully validated at step 508. If not, (a "no" determination at step 510), then at step 512 includes generating a report. The report pinpoints the trouble locations or otherwise provides a human-readable description of the uncorrected errors that caused validation failure at step 508. The report is passed to one or more analyst or technicians to correct the graph by applying one or more manual corrections at step 504. The process then repeats.

Returning to step 510, if the graph is validated (a "yes" determination at step 510), then the process terminates. The graph is then stored for later use. The graph can be called up or retrieved when the aircraft lands or is otherwise located at the airport to which the graph applies. The graph can also be updated as desired according to the method of FIG. 5 as the taxiway system at the airport changes. In some embodiments, the graph may be updated on a regular basis or continually in order to account for ongoing changes directed by an air traffic controller or other changing conditions.

Attention is now turned to FIG. 6A, FIG. 6B, FIG. 6C, FIG. 6D, FIG. 6E, FIG. 6F, FIG. 6G, and FIG. 6H, which are graphical representations of errors that result from using an unedited base layer of a graph database generated by the method shown in FIG. 5, together with graphical representations of techniques for correcting the errors, in accordance with one or more embodiments. Thus, FIG. 6A through FIG. 6H show techniques for refining the base layer graph database generated above. As indicated above, other types of data structures are possible with respect to the one or more embodiments; thus, the techniques described with respect to FIG. 6A through FIG. 6H are not necessarily limited to these examples. The techniques described with respect to FIG. 6A through FIG. 6H may be implemented using the system of FIG. 1, the methods of FIG. 2A through FIG. 2K, and/or the computing system and network shown with respect to FIG. 7A and FIG. 7B.

Attention is first turned to FIG. 6A through FIG. 6F, which show examples of step 502 of FIG. 5, applying automated corrections. FIG. 6A, FIG. 6B, FIG. 6C, and FIG. 6D show automatically correcting incomplete sections. FIG. 6E and FIG. 6F show automatically correcting remaining unknown labels.

Figure 6A:
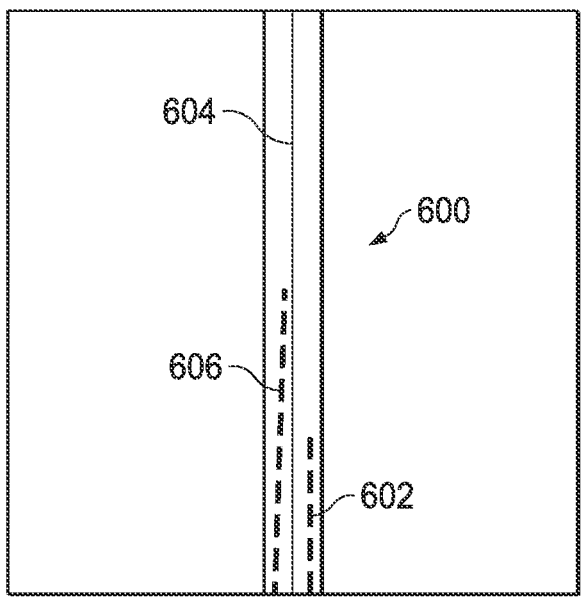
FIG. 6A, FIG. 6B, FIG. 6C, FIG. 6D, FIG. 6E, FIG. 6F, FIG. 6G, and FIG. 6H are graphical representations of errors that result from using an unedited base layer of a graph database generated by the method shown in FIG. 5, together with graphical representations of techniques for correcting the errors, in accordance with one or more embodiments.

FIG. 6A shows a taxiway system (600) having potential pathways that should connect, but do not. For example, it is known that path (602) connects to path (604). Path (606) also connects to path (604). However, neither path (602) nor path (606) connect to path (604) in taxiway system (600). The known, but not represented connections, may be gathered by the computer either from data or metadata in the underlying relational database from which the base layer is generated, or from other sources of information such as pictorial representations of the taxiway system or a list of known intersections in the taxiway system.

Figure 6B:
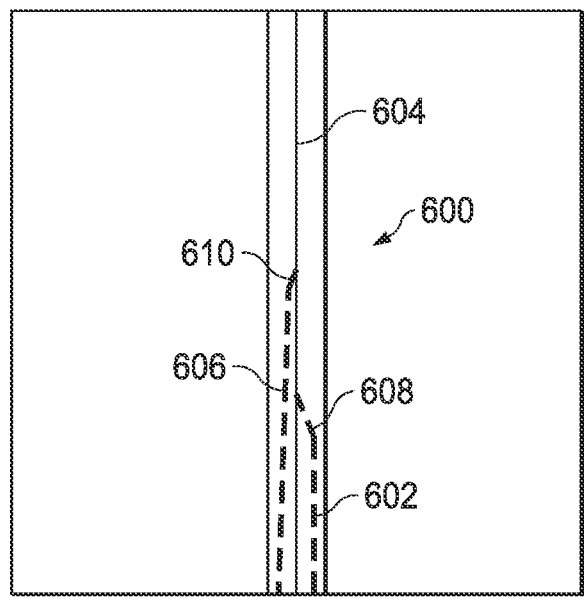

The process of automatic corrections can be used to add connections to the paths in taxiway system (600). In particular, path segment (608) in FIG. 6B is placed automatically to connect path (602) and path (604). Similarly, path segment (610) is placed automatically to connect path (606) to path (604).

Thus, FIG. 6A and FIG. 6B show an example of replacing incomplete sections of a taxiway system (600). Due to the nature of converting the relational database to the graph database, many edges in the base layer approach each other but never actually meet. One of the corrections made is to add connection points between these edges so that routes can be generated between them.

However, some sections of paths are determined to be invalid through a series of checks. The invalid sections are replaced with a combination of delete and create corrections. The one or more embodiments take into account a number of correction types, such as no edges being within the pavement polygon, not all edges within the pavement polygon being connected, and not all adjacent polygons having edges approaching each other being connected.

Figure 6C:
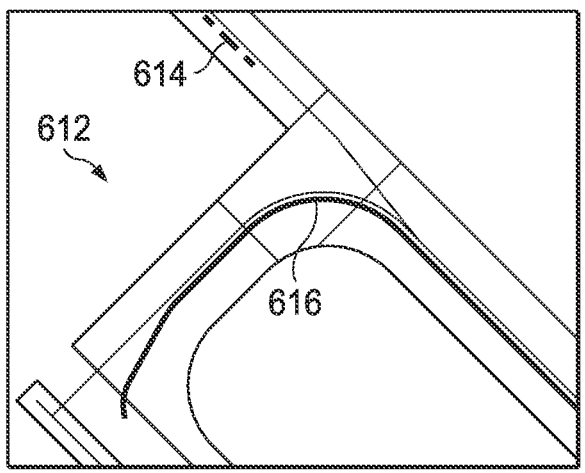
Figure 6D:
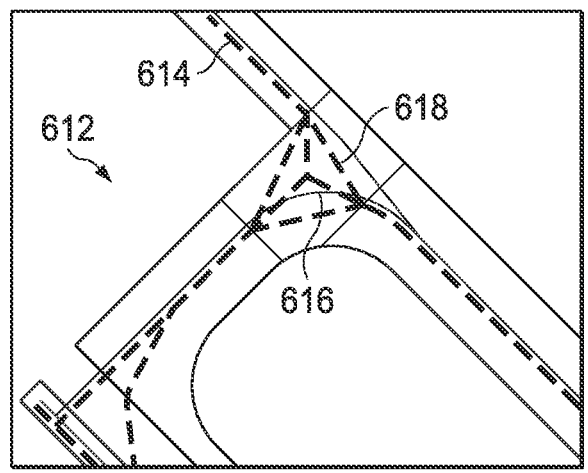
Figure 6E:
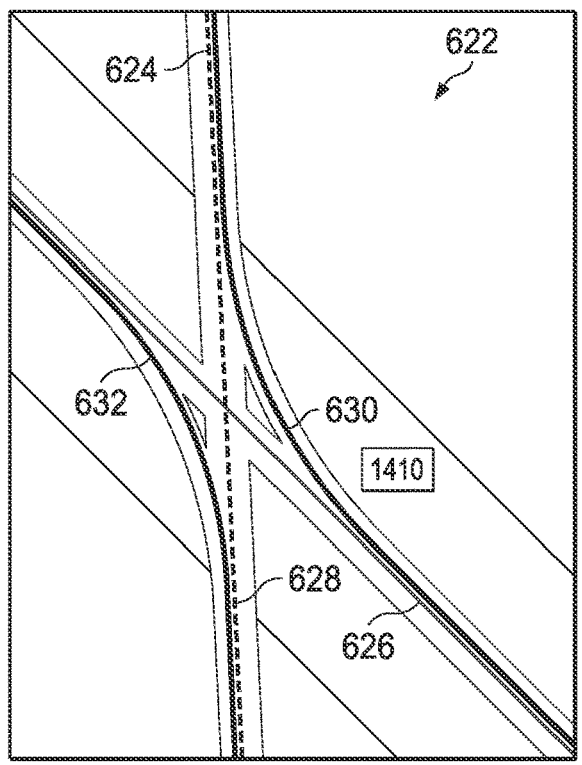
Figure 6F:
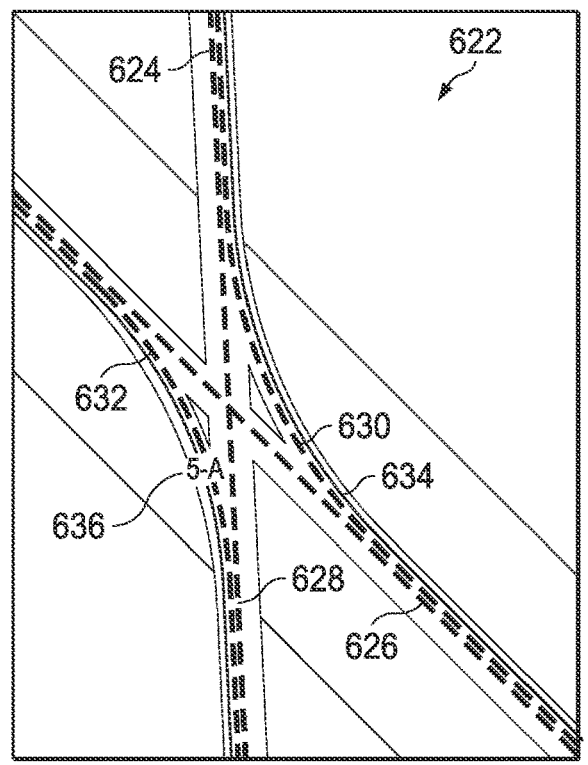
Figure 6G:
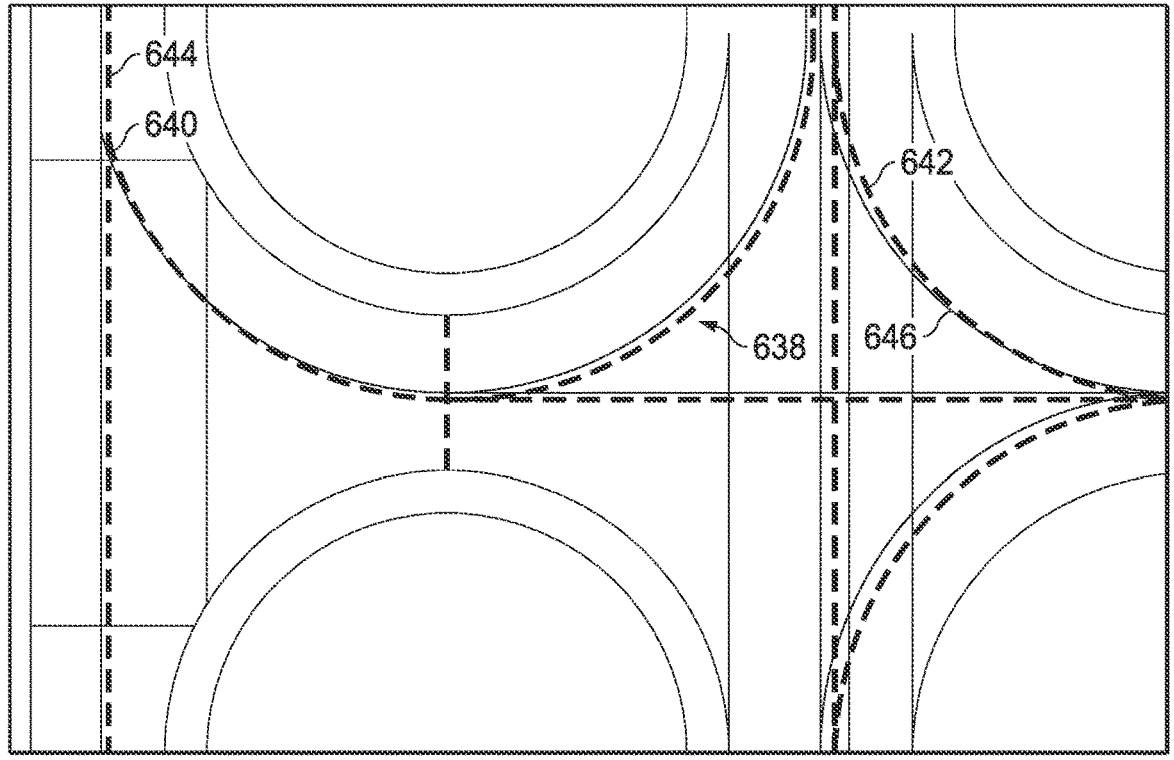

Attention is now turned to FIG. 6C and FIG. 6D, which show another example of correcting incomplete sections. FIG. 6C shows another taxiway system (612). A taxiway path (614) edge is adjacent to a runway path (616) edge. As shown in FIG. 6D, connecting paths are automatically added, such as connecting path (618).

Attention is now turned to FIG. 6E and FIG. 6F, which show an example of automatically assigning labels. In the taxiway system (622) of FIG. 6E, taxiway path (624) edge connects to runway path (626) edge. Similarly, taxiway path (628) edge connects to the runway path (626). In the example of FIG. 6E, connecting paths between the runway and the two taxiways were already automatically detected, including connecting path (630) edge and connecting path (632) edge. However, no labels were assigned to the connecting path (630) edge and connecting path (632) edge in the underlying relational database.

Nevertheless, the automated correction process shown in FIG. 5 uses the labels provided in the relational database for the taxiway path (624), the runway path (626), and the taxiway path (628) to derive labels for the connecting path (630) edge and the connecting path (630) edge. Thus, for example in FIG. 6F, label (634) is generated for the connecting path (630) edge and label (636) is generated for the connecting path (632) edge. The labels are combinations of the existing labels for the labeled taxiways and the runway.

Additionally, labeled paths in the taxiway system may be re-labeled for clarity or some other reason. For example, in FIG. 6E, the taxiway crossing the runway 13.31 has the label "SNA". In FIG. 6F, the same taxiway has been relabeled "A".

Attention is now turned to FIG. 6G. FIG. 6G shows an example of an exported routable graph (638) superimposed over a map of a taxiway system. To export the graph, initially the base layer and corrections layers are combined. The graphical data from each edge is then used to generate routable nodes (such as node (640) and node (642)) and edges (such as edge (644) and edge (646)). The nodes and edges define the graph database, which is then exported for use to generate pathways according to the methods described with respect to FIG. 2A through FIG. 2K.

Figure 6H:
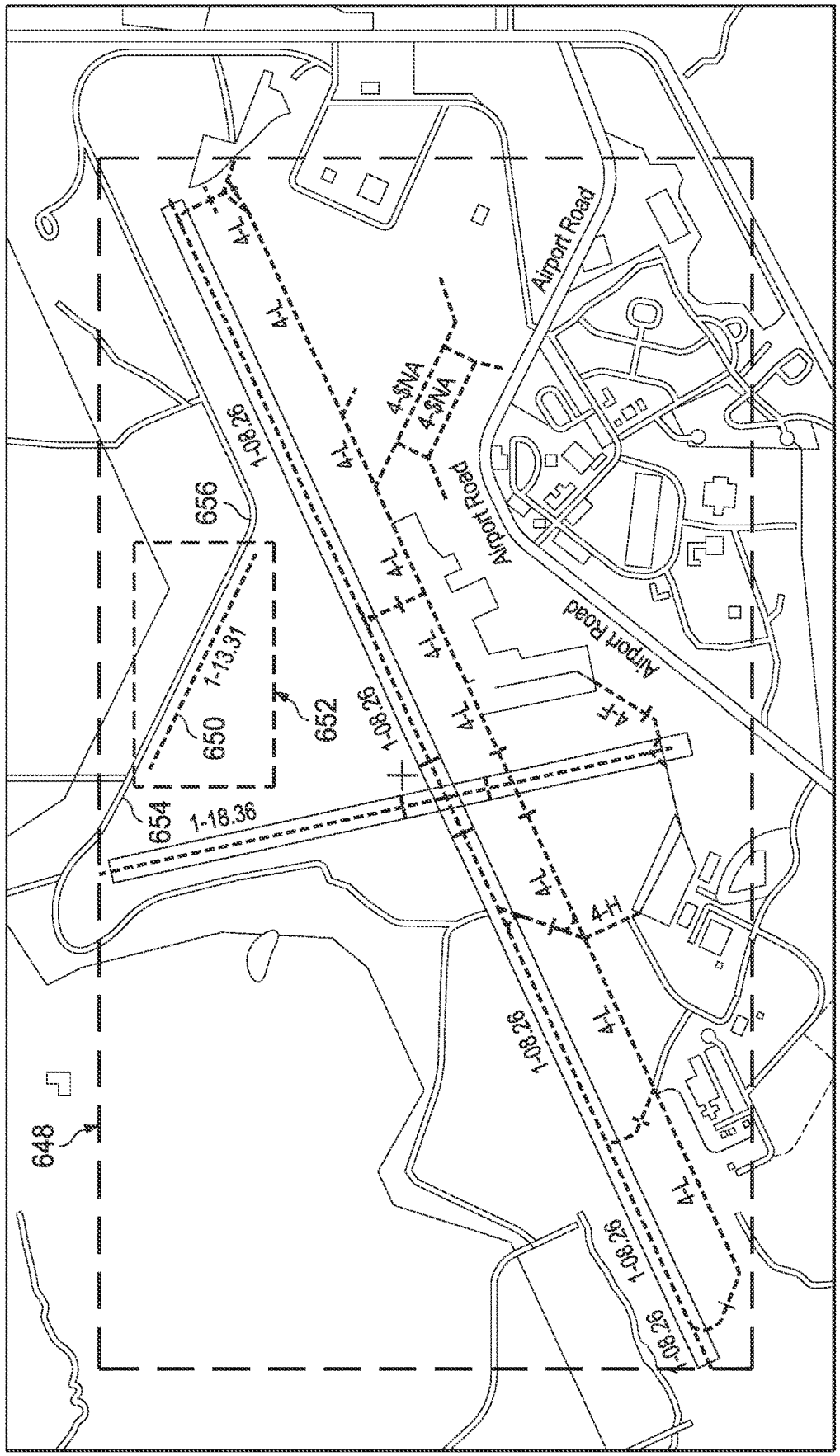

Attention is now turned to FIG. 6H. FIG. 6H shows an example of validating a routable graph (648). The validation step determines if the exported graph is fully connected and routable. If not, a report is generated which pinpoints the trouble locations for analysts to correct via manual corrections.

In the example of FIG. 6H, path segment (650) shown in dashed box (652) does not connect to other parts of the routable taxiway system as the path segment (650) should. The missing connections can be seen by a human by noting the underlying taxiways shown in the map but not as a path, such as road (654) and road (656). However, the computer, for whatever reason, did not automatically supply the missing path segments that would connect path segment (650) to other parts of the routable taxiway system shown in FIG. 6H.

Thus, the graph database is returned to a human technician, who can then fill in the missing path segments and their corresponding labels. Once the graph database is completed, the graph database is exported for later use as described with respect to FIG. 2A through FIG. 2K.

Figure 7A:
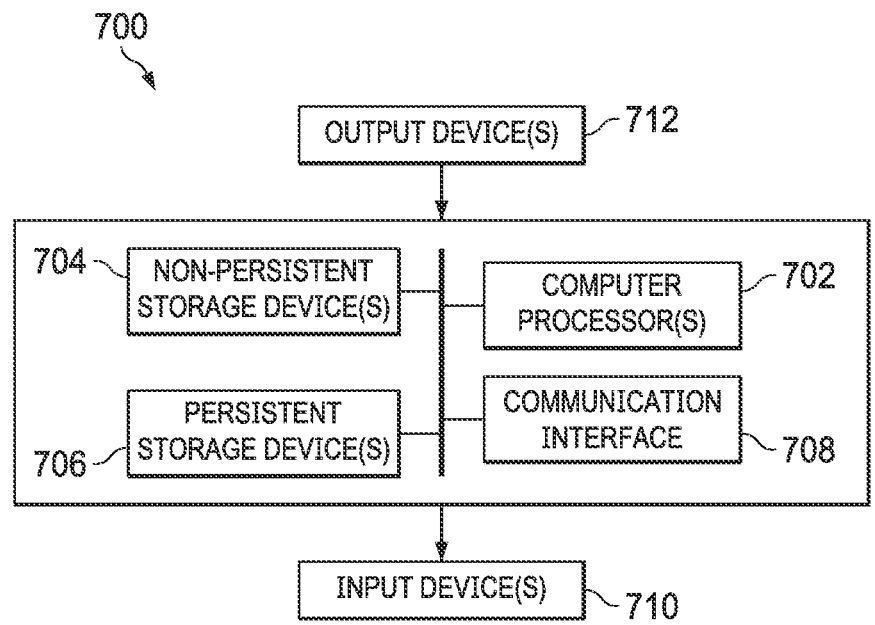
FIG. 7A and FIG. 7B show a computing system and network, in accordance with one or more embodiments.
Figure 7B:
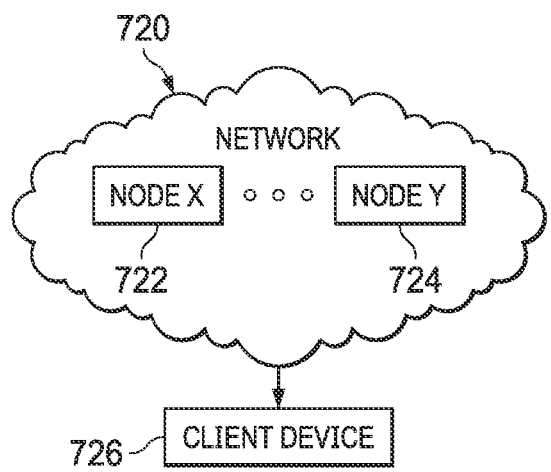

FIG. 7A and FIG. 7B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 7A, the computing system (700) may include one or more computer processor(s) (702), non-persistent storage device(s) (704) (e.g., volatile memory, such as random access memory (RAM), cache memory), persistent storage device(s) (706) (e.g., a hard disk, an optical drive such as a compact disk (CD) drive or digital versatile disk (DVD) drive, a flash memory, etc.), a communication interface (708) (e.g., Bluetooth interface, infrared interface, network interface, optical interface, etc.), and numerous other elements and functionalities that implement the features and elements of the disclosure.

The computer processor(s) (702) may be an integrated circuit for processing instructions. For example, the computer processor(s) (702) may be one or more cores or micro-cores of a processor. The computing system (700) may also include one or more input device(s) (710), such as a touchscreen, a keyboard, a mouse, a microphone, a touchpad, an electronic pen, or any other type of input device.

The communication interface (708) may include an integrated circuit for connecting the computing system (700) to a network (not shown) (e.g., a local area network (LAN), a wide area network (WAN) such as the Internet, a mobile network, or any other type of network) and/or to another device, such as another computing device.

Further, the computing system (700) may include one or more output device(s) (712), such as a screen (e.g., a liquid crystal display (LCD), a plasma display, a touchscreen, a cathode ray tube (CRT) monitor, a projector, or other display device), a printer, an external storage, or any other output device. One or more of the output device(s) (712) may be the same or different from the input device(s) (710). The input and output device(s) (710 and 712) may be locally or remotely connected to the computer processor(s) (702), the non-persistent storage device(s) (704), and the persistent storage device(s) (706). Many different types of computing systems exist, and the aforementioned input and output device(s) (710 and 712) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform the one or more embodiments.

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system (700) shown in FIG. 7A, or a group of nodes combined may correspond to the computing system (700) shown in FIG. 7A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system (700) shown in FIG. 7A. Further, the client device (726) may include and/or perform all or a portion of the one or more embodiments.

The computing system (700) or group of computing systems described in FIG. 7A and FIG. 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the one or more embodiments, may extract one or more data items from the obtained data. For example, the extraction may be performed as follows by the computing system (700) in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (700) of FIG. 7A, while performing the one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (700) in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (700) of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (700) of FIG. 7A and the nodes (e.g., node X (722), node Y (724)) and/or client device (726) in FIG. 7B. Other functions may be performed using one or more embodiments.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A method comprising:
    displaying, in a graphical user interface (GUI) of a computer, a map of a plurality of airport taxiways;
    receiving a start point on the map;
    receiving an endpoint on the map;
    generating, automatically, a path for an aircraft to take to navigate the plurality of airport taxiways from the start point to the endpoint by:
        receiving a relational database that defines points and edges for the map of the plurality of airport taxiways;
        converting the relational database into a directed graph by:
            generating a base layer using the relational database;
            generating a corrected base layer by correcting the base layer;
            generating nodes and edges from graphical data in the corrected base layer;
            verifying that the nodes and edges are connected and routable such that there is a path from any one node to any other single node; and
            exporting the nodes and edges as the directed graph; and
        generating the path by querying the directed graph; and
    superimposing the path on the map in the GUI.

2. The method of claim 1, further comprising:
    updating a keyboard on the GUI based on the path generated.

3. The method of claim 2, further comprising:
    receiving, based on a user interaction with the GUI, a waypoint or path change command;
    generating a revised path by revising the path based on the waypoint or path change command;
    removing a superimposition of the path on the map in the GUI; and
    superimposing the revised path on the map in the GUI.

4. The method of claim 1, further comprising:
    updating the GUI to display only a subset of all possible waypoints or path change commands that can be used to subsequently change the endpoint or the path, the subset comprising permissible endpoints, waypoints, and path commands.

5. The method of claim 1, further comprising:
    receiving, prior to generating, a constraint from a controller,
    wherein generating the path further comprises generating the path to obey the constraint.

6. The method of claim 1, further comprising:
    minimizing, using the directed graph, a distance for the path between the start point and the endpoint.

7. A non-transitory computer readable storage medium storing computer readable program code which, when executed by a processor, performs a computer-implemented method comprising:
    displaying, in a graphical user interface (GUI) of a computer, a map of a plurality of airport taxiways;
    receiving a start point on the map;
    receiving an endpoint on the map;
    generating, automatically, a path for an aircraft to take to navigate the plurality of airport taxiways from the start point to the endpoint by:
        receiving a relational database that defines points and edges for the map of the plurality of airport taxiways;
        converting the relational database into a directed graph by:
            generating a base layer using the relational database;
            generating a corrected base layer by correcting the base layer;
            generating nodes and edges from graphical data in the corrected base layer;
            verifying that the nodes and edges are connected and routable such that there is a path from any one node to any other single node; and
            exporting the nodes and edges as the directed graph; and
        generating the path by querying the directed graph; and
    superimposing the path on the map in the GUI.

8. The method of claim 1, wherein generating the path comprises:
    applying an expanded Dijkstra algorithm comprising a Dijkstra algorithm constrained by a delayed label domination algorithm that penalizes disfavored possible paths, wherein the disfavored possible paths comprise those paths that violate a constraint.

9. The method of claim 1, further comprising:
    updating, concurrently with receiving the start point and the endpoint, the directed graph to ensure at least one connection between the start point and the endpoint.

10. The method of claim 1, wherein generating the base layer comprises:
    importing and normalizing taxiway guidance lines, taxiway holding positions, runway exit lines, and runway centerlines, and assigning persistent identifiers using the relational database.

11. The method of claim 1, wherein correcting the base layer comprises an action selected from the group consisting of:
    replacing an incomplete section of the directed graph by forcing approaching edges to meet at a corresponding node;
    removing an invalid edge or an invalid node;
    renaming an unknown label; and
    receiving a manual correction to the base layer.

12. The method of claim 1, further comprising:
    adding an edge or a node to ensure that all nodes and all edges are connected and routable.

13. A system comprising:
    a computer comprising:
        a processor;
        a data repository in communication with the processor; and
        a display device in communication with the processor and configured to display a graphical user interface (GUI),
    wherein the data repository stores computer readable program code which, when executed by the processor, performs a computer-implemented method comprising:

displaying, in the graphical user interface (GUI), a map of a plurality of airport taxiways;
receiving a start point on the map;
receiving an endpoint on the map;
generating, automatically, a path for an aircraft to take to navigate the plurality of airport taxiways from the start point to the endpoint by:
  receiving a relational database that defines points and edges for the map of the plurality of airport taxiways;
  converting the relational database into a directed graph by:
    generating a base layer using the relational database;
    generating a corrected base layer by correcting the base layer;
    generating nodes and edges from graphical data in the corrected base layer;
    verifying that the nodes and edges are connected and routable such that there is a path from any one node to any other single node; and
    exporting the nodes and edges as the directed graph; and
  generating the path by querying the directed graph; and
superimposing the path on the map in the GUI.

14. The system of claim 13, wherein the display device and the GUI are configured to receive graphical input that designates the start point and the endpoint.

15. The system of claim 13, wherein:
the data repository stores the relational database.

16. The system of claim 15, wherein the computer readable program code for generating the base layer comprises computer readable program code for:
importing and normalizing taxiway guidance lines, taxiway holding positions, runway exit lines, and runway centerlines, and assigning persistent identifiers using the relational database.

17. The system of claim 13, wherein the computer readable program code further comprises computer readable program code for:
updating a keyboard on the GUI based on the path generated.

18. The system of claim 17, wherein the computer readable program code further comprises computer readable program code for:
receiving, based on a user interaction with the GUI, a waypoint or path change command;
generating a revised path by revising the path based on the waypoint or path change command;
removing a superimposition of the path on the map in the GUI; and
superimposing the revised path on the map in the GUI.

19. The system of claim 13, wherein the computer readable program code further comprises computer readable program code for:
receiving, prior to generating, a constraint from an air traffic controller,
wherein generating the path further comprises generating the path to obey the constraint.

20. The non-transitory computer readable storage medium of claim 7, wherein the computer-implemented method further comprises:
receiving, prior to generating, a constraint from a controller, wherein generating the path further comprises generating the path to obey the constraint.

* * * * *